(12) United States Patent
Hashimoto et al.

(10) Patent No.: US 6,859,708 B2
(45) Date of Patent: Feb. 22, 2005

(54) VEHICLE CONTROL SYSTEM

(75) Inventors: Hiroshi Hashimoto, Wako (JP); Yuji Nagatani, Wako (JP); Yoshiki Tatsutomi, Wako (JP); Jyunichi Kobayashi, Wako (JP); Toshiaki Hirota, Wako (JP); Hiroyuki Abe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 239 days.

(21) Appl. No.: 09/991,103

(22) Filed: Nov. 21, 2001

(65) Prior Publication Data

US 2002/0091475 A1 Jul. 11, 2002

(30) Foreign Application Priority Data

Nov. 22, 2000 (JP) ....................... 2000-356442
Nov. 22, 2000 (JP) ....................... 2000-356443
Nov. 22, 2000 (JP) ....................... 2000-356444

(51) Int. Cl.$^7$ .......................... G06F 17/00; G06F 7/00; G06F 19/00
(52) U.S. Cl. .............................. 701/48; 701/49; 701/45
(58) Field of Search .............................. 701/48, 49, 36, 701/39, 45, 22; 345/24, 440.1; 180/65.2, 65.3; 320/104

(56) References Cited

U.S. PATENT DOCUMENTS

| | | | | |
|---|---|---|---|---|
| 4,236,594 A | * | 12/1980 | Ramsperger | 180/167 |
| 5,296,869 A | * | 3/1994 | Jonker et al. | 345/24 |
| 5,487,002 A | * | 1/1996 | Diller et al. | 701/1 |
| 5,643,352 A | * | 7/1997 | Werth | 75/255 |
| 6,484,830 B1 | * | 11/2002 | Gruenwald et al. | 180/65.2 |
| 6,499,027 B1 | * | 12/2002 | Weinberger | 707/4 |
| 2002/0101210 A1 | * | 8/2002 | Boisvert et al. | 318/469 |

* cited by examiner

Primary Examiner—Thomas G. Black
Assistant Examiner—Ronnie Mancho
(74) Attorney, Agent, or Firm—Lahive & Cockfield, LLP; Anthony A. Laurentano, Esq.

(57) ABSTRACT

The present invention provides a vehicle control system, which easily carries out modifications such as updating and improvement of the system, improving the transmission efficiency of the data and responsiveness of the system, and allowing the redundancy to be effectively used even during normal operation of the network. In the vehicle control system, an electric control device is formed comprising a cooperative control ECU which acts as a server apparatus and a plurality of subsystems which are connected to this cooperative control ECU and act as client apparatuses. The plurality of subsystems comprise, for example, a motor control ECU, a reactive gas supply control ECU, an electrical power distribution control ECU, and a cell voltage detection control ECU. Each of the ECUs which forms each of the subsystems carries out I/O processing for the control signals that are sent to and received from the cooperative control ECU and shut down processing and protective processing during abnormal operation such as a network stoppage. The cooperative ECU carries out control operations for controlling each of the ECUs and the controlled objects based on control signals obtained from the I/O processing of each of the ECUs.

7 Claims, 10 Drawing Sheets

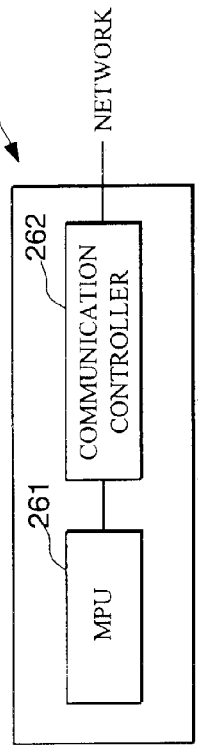
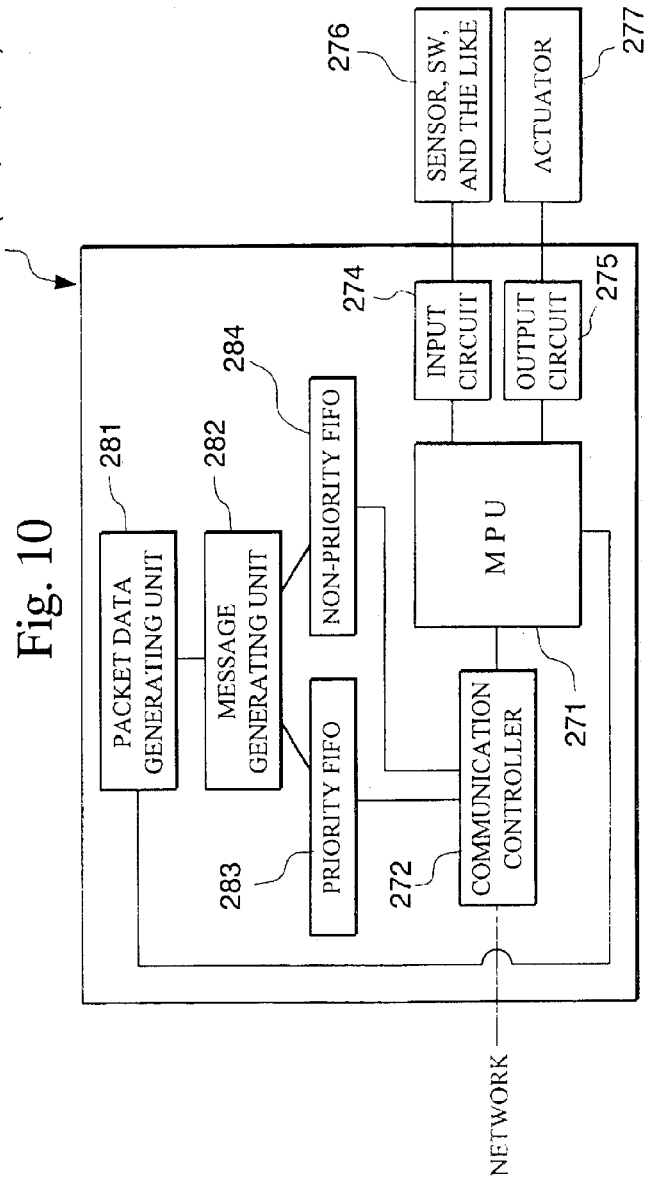
Fig. 9
Fig. 10

VEHICLE CONTROL SYSTEM

BACKGROUND OF THE INVENTION

1. Field of the Invention

The present invention relates to a vehicle control system which connects and cooperatively operates a plurality of control devices.

2. Description of the Related Art

Conventionally, as disclosed, for example, in Japanese Unexamined Patent Application, First Publication, No. Hei 7-7504, a vehicular LAN which connects together a plurality of electric control devices that are mounted in a vehicle is known.

In this vehicular LAN, a plurality of electronic control units (ECUs) send sensor data to one control operating communication unit, and the control operation communication unit carries out operations based on the received data, returns control signals to each of the electronic control units, and thereby a network having what is termed a server-client relationship is formed.

In the vehicular LAN according to the one example of the conventional technology described above, there are cases in which, when electrical equipment such as an actuator, which is an controlled object connected to the plurality of electronic control units, is modified, the type of the operation command values output in order to direct the operation of the controlled object also changes.

Accompanying this, when the processing content of each of the electronic control units is modified, and in particular, in the case that a plurality of electronic control units are controlled so as to operate cooperatively, there is the concern that the processing content of other electronic control units having controlled objects that have not changed will also have to be changed.

Furthermore, the control signal that controls the operation of the controlled object is calculated in the control operation communication unit, and thus in the control operation communication unit, there are cases in which the reading device for receiving and reading each of the types of data output from the modified controlled object, the conversion device that converts the received data to a predetermined variable format that is used in the control operation, and the like, must be newly provided, or that the content of the control operation must be changed in conformity with the format of the received data.

In particular, as in a fuel cell vehicle, for example, in a system in which the types of the control signals sent and received between a control operation communication unit and a plurality of electronic control devices or controlled objects, when the type of these control signals must also be changed along with modifications in the controlled objects, the problem occurs that updating and improvement of the control system requires complicated labor. This is the first problem.

In addition, in a vehicular LAN according to the one example of the conventional technology described above, in the case that data is sent to the control operation communication unit from the plurality of electronic control units, a method is known in which data is partitioned into variable length packets and then sent in order to improve the transmission efficiency.

However, when the packet length is made large in order to improve the transmission efficiency, the problem occurs that the necessary waiting time until the completion of the transmission of one packet becomes long, and thereby the communication delay time becomes long and the responsiveness of the control system deteriorates. This is the second problem.

Furthermore, in such a vehicular LAN, when damage occurs on the network that connects the control operation communication unit and the plurality of electronic control units, there is a concern that a chain of damage or failure in the system as a whole will occur. Thus, a method is known in which redundancy is provided in order to maintain functionality during the occurrence of damage that is equivalent to that during normal operation by introducing redundancy into the network.

However, in the vehicular LAN according to the one example of the conventional technology described above, the redundant system duplicates, so to speak, the operational network structure used during normal operation, and the redundant system is used after switching from the operational system on which damage has occurred. This devices that when the operational network is operating normally, the network of the redundant system is not used to send or receive data, and in the case that the damage occurs, data identical to the data sent and received by the operational network is sent and received by the network of the redundant system.

Thus, during normal operation of the operational network, the problem occurs that the network of the redundant system cannot be effectively used. Furthermore, because the network of the redundant system is formed simply by duplicating the operational network structure, the scale of the vehicular control system as a whole increases, and there is the problem that the costs when constructing the vehicular control system balloon. This is the third problem.

SUMMARY OF THE INVENTION

In consideration of the above-described problems, in a first aspect of the present invention, it is an object of the present invention to provide a vehicle control system that can easily carry out modifications such as updating and improvement of the system, which is the first problem, that connects together via a communication line (for example, the network 51 in the embodiments described below) the control devices (for example, the motor control ECU 22, the reactive gas supply control ECU 23, the electric power distribution control ECU 24, and the cell voltage detection control ECU 25 in the embodiment described below) that act as a plurality of subsystems in which controlled objects (for example, the motor drive unit 11 for travel, the fuel cell 12, the reactive gas supply unit 13, the power storage apparatus 14, the electrical power distribution unit 11, and the cooling units 16 and 16 in the embodiments described below) are connected to a cooperative control device (for example the cooperative control unit ECU 21 in the embodiments described below) that cooperatively operates the plurality of control devices, and wherein the plurality of control devices provide an input/output control devices (for example, the I/O processing unit 71a in the embodiments described below) that carries out input and output processing for the signals sent and received between the cooperative control device and the controlled objects, and said cooperative control device provides a control operation device (for example the MPU 61 in the embodiments described below) that calculates the control signals that control the operation of the plurality of control devices and the controlled objects.

According to the vehicle control system having the structure described above, in each of the plurality of control devices controlled so as to operate cooperatively, the part that carries out the control operation that calculates the control signal for the operation of the controlled objects and the input/output control device that carries out input and output processing (I/O processing) of the control signals sent and received between the plurality of control devices, the cooperative control device, and the controlled objects are separated. In addition, the parts that carry out each of the control operations of the plurality of control devices are accommodated in a server apparatus, that is, accommodated altogether in the cooperative control device, and only the input/output control device remains in each of the subsystems that act as client apparatuses, that is, the plurality of control devices, which are, for example, distributed in proximity to the controlled objects.

Thereby, for example, even if the part corresponding to the control operation of any of the subsystems is modified, only the processing content of the cooperative control device needs to be changed. In addition, even in the case that the input/output control device is modified due to the modifications of the controlled objects or the like, only the input/ output control device of the control device that is the object needs to be modified, changes that encompass the other control devices can be restrained, and modifications such as updating and improving the vehicle control system can be easily carried out.

Furthermore, in a second aspect of the invention, the vehicle control system is characterized in that the control operation device of the cooperative control device calculates the controlled physical measurements (for example, the logical values such as the required torque value, motor output, flow rate and pressure of the reactive gas in the embodiments described below) to be attained by the operation of the plurality of control devices and controlled objects as control signals that control the operation of the plurality of control devices and the controlled objects, and the input/ output control device of the control device converts the controlled physical measurements that have been received from the cooperative control devices to operation command values (for example, the alternating current voltage command value that is output to the PDU 32 that drives and controls the motor 31 for travel, the control signal for maintaining the desired rotation speed to the air compressor 41, the control signals that control the valve aperture of the exhaust valve 46, or the like) that indicate directly the operation of the control devices and the controlled objects.

According to the vehicle system having the structure described above, the control signals that are sent and received between the cooperative control device and the plurality of control devices and controlled objects are controlled physical measurements comprising, for example, general use physical measurements, abstract control values, or the like, and even in the case, for example, that appropriate controlled objects are modified, the controlled physical measurements that are output from the cooperative control device do not need to be modified, and only the input/output control device of the control device that connects the controlled objects needs to be modified. Specifically, at the input out control device, the controlled physical measurements received from the cooperative control device are converted to action command values that depend on each of the controlled objects.

Thereby, modifications such as updating and improvement of the vehicle control system can be easily carried out without modifying the contents of the control operation in the cooperative control device.

Furthermore, in a third aspect of the present invention, the vehicle control system is characterized in that the plurality of control devices provide an autonomous control device (for example, the autonomous control unit 71b in the embodiments described below) that controls the operations of the controlled objects independently from the cooperative control device during the occurrence of an abnormality between the communication systems and the cooperative control device or the cooperative control device.

According to the vehicle control system having the structure described above, even in the case of the occurrence of an abnormality such as the stoppage of the communication system or malfunction of the cooperative control device, it is possible to prevent erroneous control of the controlled objects from being carried out, and prevent the controlled objects from failing.

Furthermore, in order to solve the second problem, the present invention has as an object providing a vehicle control system that can improve the transmission efficiency of the data sent and received between the plurality of control devices, and at the same time, improve the responsiveness of the system.

In order to obtain this object, in a fourth aspect of the present invention, in a vehicle control system that connects together via a communication line (for example, the network 51 in the embodiments described below) control devices that act as a plurality of subsystems in which controlled objects (for example, the motor drive unit 11 for travel, the fuel cells 12, the reactive gas supply control unit 13, the power storage unit 14, the electrical power distribution unit 15, and the cooling units 16 and 16 in the embodiments described below) are connected to a cooperative control device (for example the cooperative control unit ECU 21 the embodiments described below) that cooperatively operates the plurality of control devices, comprising a priority assigning device (for example, the step S 01 in the embodiments described below) that assigns a priority to the data sent and received via the communication lines, a plurality of FIFO storage devices (for example, the priority FIFO 83 and the non-priority FIFO 84 in the embodiments described below) that temporarily store data after being classified depending on priority, and a data sending device (for example, step S 11 to step S 13 in the embodiments described below) that sends data according to the priority from the FIFO storage device that stores the data assigned a high priority.

According to the vehicle control system having the structure described above, a plurality of FIFO storage devices that temporarily store data to the sent are provided, the priority of data used during control that requires, for example, immediate responsiveness is assigned a high priority, the data is stored in the a different FIFO storage device depending on this priority, and the data is sent in order of priority. Thereby, the communication delay time for data having a high priority can be reduced.

Furthermore, in a fifth aspect of the present invention, the vehicle control system is characterized in that the data sending device sends the data having a high priority by stopping the transmission of the data being sent when data that has been assigned a higher priority than the data that is being sent is stored in the FIFO storage device.

According to the vehicle control system having the structure described above, for example, even during the transmission of data having a relatively low priority, data having a relatively high priority can be sent by interruption, and there is no need to wait until all of the data having the relatively low priority has completed transmission. Thus, the data having the high priority can be sent immediately.

Furthermore, in a sixth aspect of the present invention, the vehicle control system comprises a packet generating device (for example, the packet data generating unit 81 in the embodiments described below) that generates packets as data and a message generating device (for example, the message generating unit 82 in the embodiments described below) that partitions the packets into messages depending on the communication protocol, and furthermore the priority assigning device assigns the priority depending on the length of the packet, the plurality of FIFO storage devices classify and temporarily store the message depending on the priority of the packets, and the data transmission device sends the message according to the priority from the FIFO storage device that stores the packets assigned a high priority.

According to the vehicle control system having the structure described above, by assigning a high priority to the packet in the message having a length that does not require partitioning according to the communication protocol, it is possible to prevent the transmission waiting time required to send one packet from becoming long, and a vehicle control system can be constructed that, for example, requires real time characteristics.

Furthermore, in order to solve the third problem described above, the present invention has as an object providing a vehicle control system that can effectively use redundancy even during the normal operation of the network in the case of duplication of the network.

In order to attain the object that solves this problem, in a seventh aspect of the present invention, a vehicle control system that connects together via a communication line (for example, the network 51 in the embodiments described below) control devices that act as a plurality of subsystems in which controlled objects (for example, the motor drive ECU 21 for travel, the reactive gas supply ECU 12, the electrical power distribution unit 21, and the cell voltage detection control ECU 25 in the embodiments described below) are connected to a cooperative control device (for example the cooperative control unit ECU 21 the embodiments described below) that cooperatively operates the plurality of control devices, where the cooperative control device comprises a plurality of different cooperative control side communication ports (for example, the cooperative communication side ports 21A, 21B, and 21C in the embodiments described below), a data sending and receiving device (for example, the communication controller 62 in the embodiments described below) that carries out sending and receiving of data to and from the plurality of control devices via the cooperative control side communication ports, and a determination device (for example, the MPU 61 in the embodiments described below) that determines whether or not an abnormality has occurred in the sending and receiving of data, and where the respective plurality of control devices each comprises a plurality of communication ports (for example, communication ports 22A and 22B, communication pots 23A and 23B, communication ports 24B and 24C, and communication ports 25A and 25C in the embodiment described above) that connect at least two or more among the plurality of cooperative control side communication ports, and depending on the results of the determination by the determination device, the data sending and receiving device of the cooperative control device sends and receives different data to and from each of the plurality of communication ports of the control devices, and in addition, the data sent and received from the communication ports where an abnormality has occurred is sent to and received from any the communication ports where an abnormality has not occurred.

According to the vehicle communication system having the structure described above, each of the control devices that act as a plurality of subsystems provide at least two or more different communication ports connected to the cooperative control devices, and because sending and receiving a plurality of data is possible in any of these communication ports, even in the case that damage has occurred to the communication at any of these transmission ports, the sending and receiving of data can be carried out via another communication port where damage has not occurred.

Furthermore, each of the cooperative control side communication ports connected to the respective plurality of communication ports of each of the control devices acts as a separate communication system, and by being set such that different data is sent to and received from each of the cooperative control side communication ports during normal operation of the network, the plurality of communication systems can be effectively used.

Thereby, for each of the plurality of communication ports provided in each of the control devices so as to be redundant, compared to the case of providing a plurality of different cooperative control side communication ports so as to correspond one-to-one, it is possible to prevent the scale of the vehicle control system as a whole from increasing, and when constructing the vehicle control system, it is possible to prevent the cost from ballooning.

Furthermore, in an eighth aspect of the present invention, a vehicle control system that connects together via a communication line (for example, the network 51 in the embodiments described below) control devices that act as a plurality of subsystems in which controlled objects (for example, the motor drive ECU 22 for travel, the fuel cell 12, the reactive gas supply ECU 23, the electrical power distribution ECU 24, and the cooling units 16 and 16 in the embodiments described below) are connected to a cooperative control device (for example the cooperative control unit ECU 21 the embodiments described below) that cooperatively operates the plurality of control devices, wherein the cooperative control device comprises a plurality of different cooperative control side communication ports (for example, the cooperative control side communication ports 21A, 21B, 21C in the embodiment described below), a data sending and receiving device (for example, the communication controller 62 in the embodiments described below) that sends and receives data to and from the plurality of control device via the cooperative control side communication ports, a determination device (for example, also the MPU 61 in the embodiment described below) that determines whether or not an abnormality has occurred in the sending or receiving of data, and a data partitioning devices (for example, the MPU in the embodiment described below) that generates a plurality of segments of partitioned data by partitioning the data according to the results of the determination by the determination device, and furthermore, each of the plurality of control devices comprises a plurality of communication ports (for example, the communication ports 22A and 22B, the communication ports 23A and 23B, the communication ports 24B and 24C, and the communication ports 25A and 25C in the embodiments described below) connected to at least two or more of the plurality of cooperative control side communication ports, and the data sending and receiving device of the cooperative control device sends and receives different data to and from each of the plurality of communication ports of the control device depending on the result of the determination of the determination apparatus, and in addition, the plurality of partitioned data is sent and received by being distributed over the plurality of communication ports on which no abnormality has occurred.

According to the vehicle control system having the structure described above, even in the case, for example, that damage occurs to the communication at any of the communication ports, the sending and receiving of data can be carried out via another communication port on which damage has not occurred, and furthermore, in the normally operating network, by being set so that different data is sent to and received from each of the cooperative control side communication ports, the plurality of communication systems can be effectively used.

In addition, the data sent to and received from a communication port where damage has occurred can be appropriately allocated, and at the same time, the data that is sent to and received from the communication port where damage has not occurred can be appropriately allocated. Thus, even in the case that damage has occurred in the sending and receiving of data to and from the appropriate communication port, the data is distributed and sent and received such that the communication traffic in the plurality of normally operating communication system proceeds smoothly, and, for example, data can be distributed and sent and received so that the communication traffic in the normal communication has a value within a predetermined range.

Thereby, even in the case that data sent and received by a communication system in which damage has occurred is sent and received by being switched to a normally operating communication system, for example, it is possible to prevent excessive increases in the communication traffic on a particular communication system.

BRIEF DESCRIPTION OF THE DRAWINGS

FIG. 9 is a bock diagram of the functions of the cooperative control ECU.

FIG. 10 is a block diagram of the functions of each of the cooperative control ECUs.

DETAILED DESCRIPTION OF THE INVENTION

Figure 1:
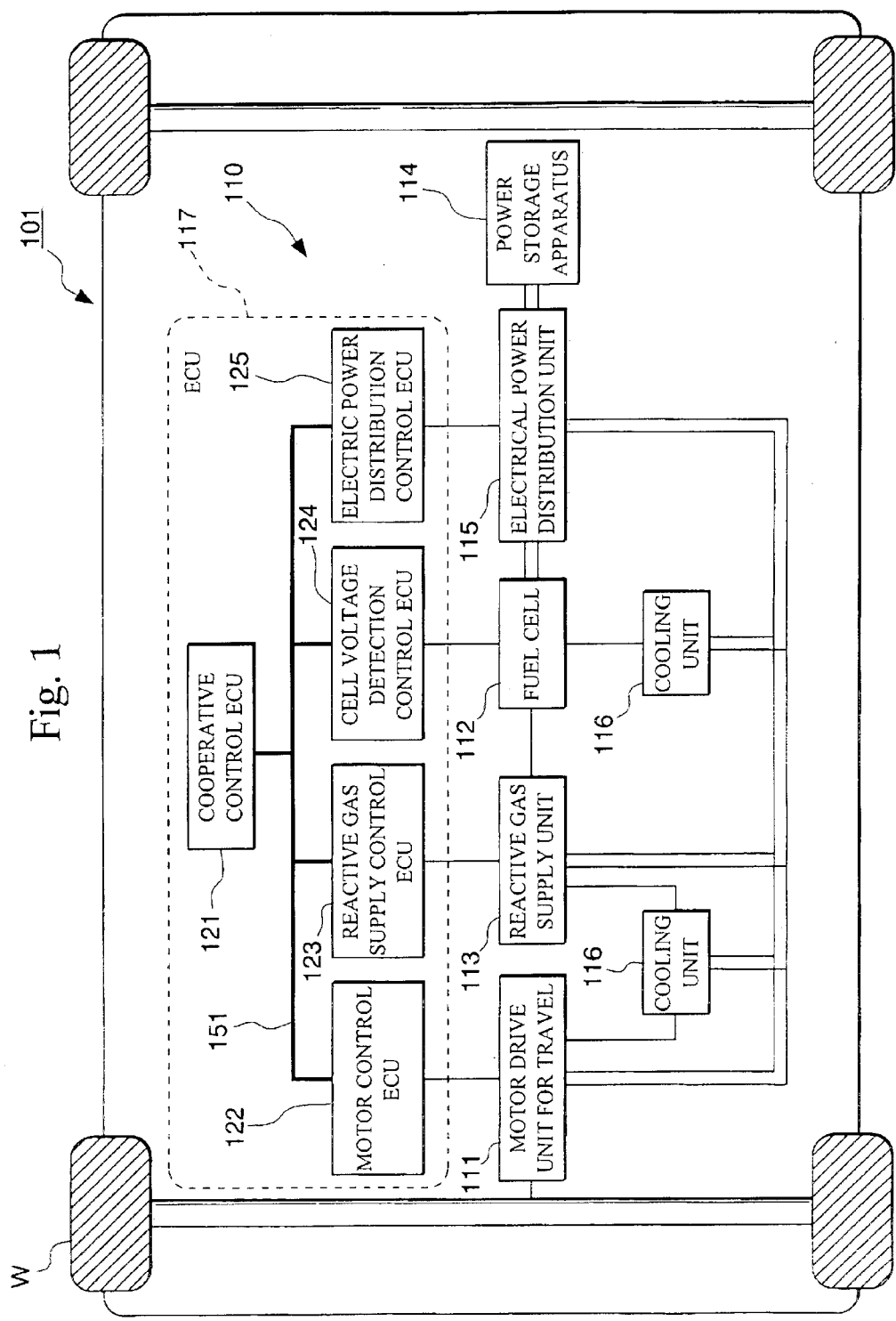
FIG. 1 is a structural drawing of the vehicle control system according to one embodiment of the present invention.

Below, several suitable embodiments of the vehicle control system according to the present invention will be explained while referring to the drawings. However, the present invention is not limited by any of the following embodiments, and for example, the essential structural elements of these embodiments can be combined together as appropriate.

First Embodiment

Figure 2:
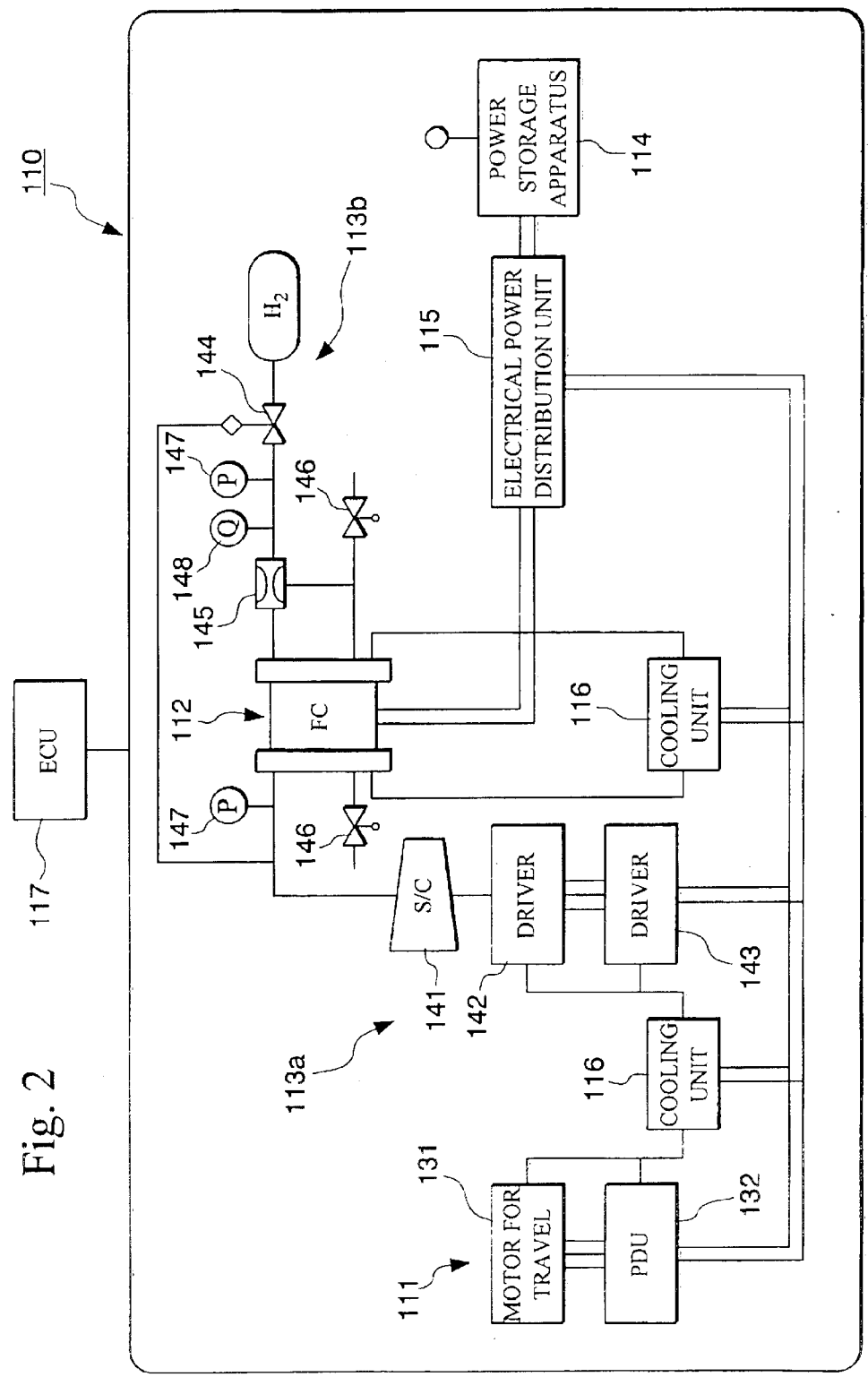
FIG. 2 is a structural drawing of the fuel cell vehicle provided with the vehicle control system shown in FIG. 1.
Figure 3:
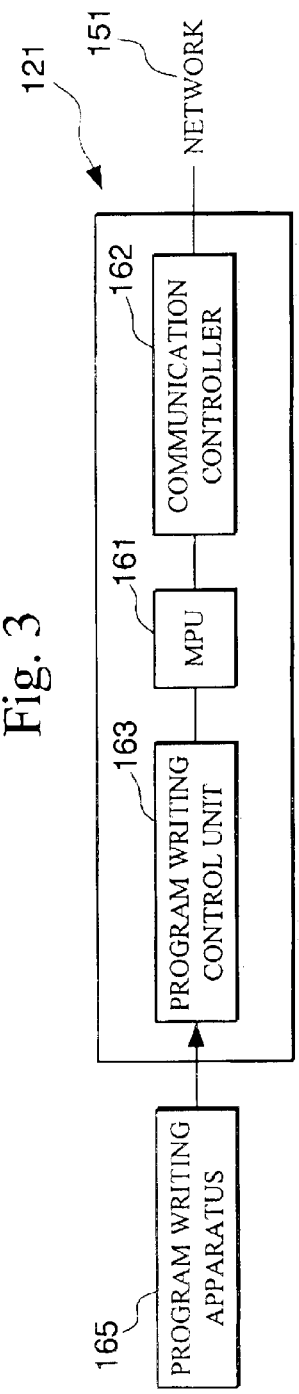
FIG. 3 is a functional block diagram of a cooperative control ECU.
Figure 4:
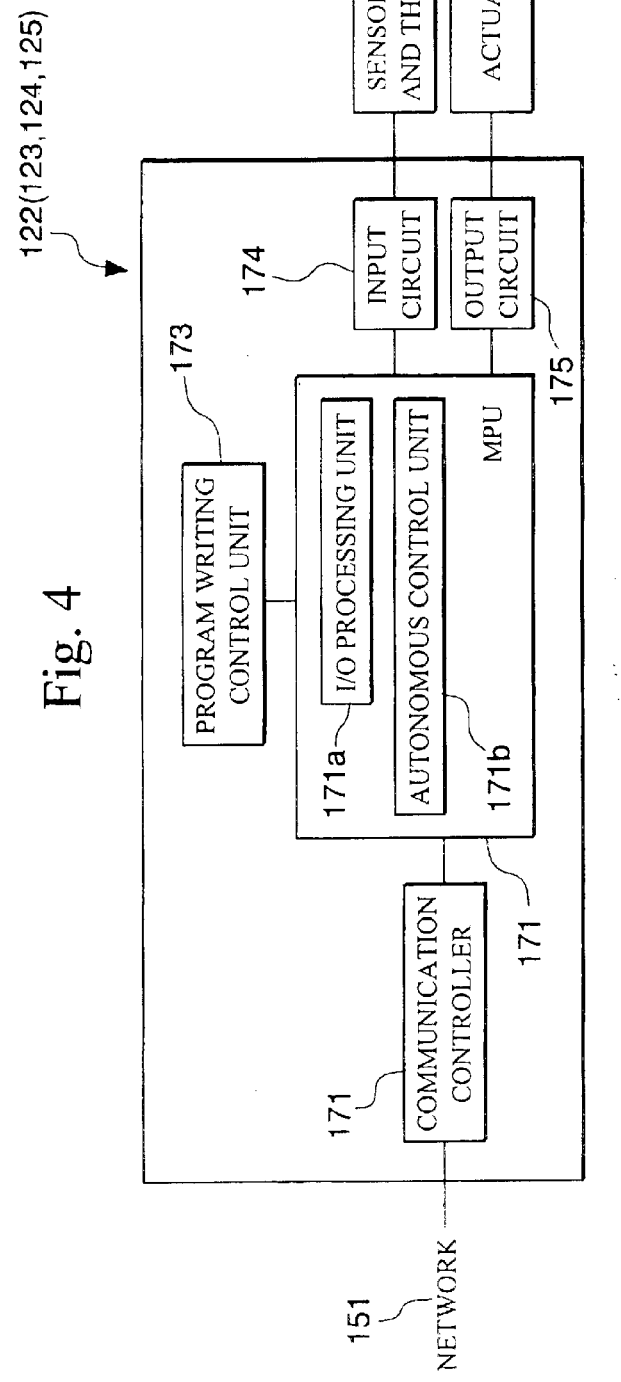
FIG. 4 is a block diagram of the functions of each ECU that acts as a plurality of sub-systems.

A first embodiment of the vehicle control system of the present invention for resolving the first problem will be explained while referring to the drawings. FIG. 1 is a structural drawing of a vehicle control system 110 according to a first embodiment of the present invention; FIG. 2 is a structural drawing of a fuel cell vehicle provided in the vehicle control system 110 shown in FIG. 1, FIG. 3 is a block diagram of the function of the cooperative control ECU 21, and FIG. 4 is a block diagram of the functions of each of the ECUs 122, . . . , 125 that act as a plurality of sub-systems.

The fuel cell vehicle 101 according to the present embodiment provides a hybrid power source apparatus formed, for example, from a fuel cell 112, a reactive gas supply unit 113, and a power storage apparatus 114 as a power source apparatus that supplies power to the motor drive unit 110 for travel, and the drive power of the motor drive unit 111 for travel that has power supplied from these power apparatuses via an electrical power distribution unit 115 is sent to the drive wheels W via a transmission system (not illustrated) such as an automatic transmission or a manual transmission.

In addition, when drive power is sent to the motor drive unit 111 for travel from the drive wheels W side during the deceleration of the fuel cell vehicle 110, the motor drive unit 111 for travel functions as a power generator, and the kinetic energy of the vehicle is recovered as electrical energy due to the generation of what is termed regenerative breaking power.

The vehicle control system 110 according to the present invention is formed comprising, for example, a motor drive unit 111 for travel, a fuel cell 112, a reactive gas supply unit 113, a power storage apparatus 114, an electrical power distribution unit 115, cooling units 116 and 116, and an ECU 117.

Furthermore, the ECU 117 is formed comprising a cooperative control ECU 121 that acts as what is termed a server apparatus, a plurality of subsystems that act as what are termed client apparatuses. Examples of the plurality of subsystems include a motor control ECU 122, a reactive gas supply control ECU 123, an electrical power distribution system 124, and a cell voltage detection control ECU 125.

As shown in FIG. 2, the motor drive unit 111 for travel is formed comprising, for example, a motor 131 for travel that acts as a permanent magnet type three phase alternating current synchronous motor having a permanent magnet that serves as a magnetic field and a PDU 132, and the motor 131 for travel is driven and controlled by the three phase alternating current supplied from the PDU 132.

The PDU 132 comprises, for example, a PWM inverter formed from switching elements such as insulated-gate bipolar transistors (IGBT), and based on the switching commands output from the motor control ECU 122, the direct current power output via the electrical power distribution unit 115 from the fuel cell 12 and the power storage apparatus 114 is converted to three phase alternating current power and supplied to the motor 131 for travel.

The fuel cell 112 comprises a stack formed by layering a plurality of cells, the cells being formed by sandwiching a solid polymer electrolyte membrane comprising, for example, a solid polymer ion exchange membrane or the like on both sides, between an anode and cathode, and providing a hydrogen electrode that supplies hydrogen gas as a fuel and an air electrode that supplies air that includes oxygen as an oxidizing agent. In addition, the hydrogen ions generated by the catalytic reaction at the anode move to the cathode by migrating through the solid polymer catalytic membrane, and power is generated by causing an electrochemical reaction with oxygen at the cathode.

The reactive gas supply unit 113 is formed comprising an air supply unit 113a that supplies air to the air electrode of the fuel cell 112 and a hydrogen supply unit 113b that supplies hydrogen gas to the hydrogen electrode. Furthermore, the air supply unit 113a is formed comprising an air compressor 141, a motor 142 that drives the air compressor 141, and a driver 143 for the motor 142.

In addition, the hydrogen supply unit 113b is formed comprising, for example, a pressure control valve 144 that supplies hydrogen gas under pressure depending on the pressure of the air supplied as a signal pressure from the air compressor 141 and an ejector 145 that mixes exhaust gas discharged from the fuel cell 111 with hydrogen gas supplied via the pressure control valve 44, and recirculates it.

Moreover, exhaust pressure valves 146 and 146 for discharging to the outside each of the exhaust gasses, that is, air and hydrogen gas, discharged from the fuel cell are provided respectively on both the air electrode side and the hydrogen electrode side of the fuel cell 112. Furthermore, a pressure gauge 147 that detects the pressure of the air on the air electrode side of the fuel cell 112 is provided, and a pressure gauge 148 that detects the pressure of the hydrogen gas and a flow meter 148 that detects the amount of flow of the same are provided on the hydrogen electrode side of the fuel cell 112.

In addition, the reactive gas supply control ECU 123, for example, receives each of the detected values detected at each of the pressure meters 147 and 147 and the flow meter 148, and outputs them to the cooperative control ECU 121 after carrying out the I/O processing to be described below. Furthermore, the reactive gas supply control ECU 123, as will be described below, outputs a control signal for maintaining the desired rotation speed in the air compressor 141 depending on the reactive gas control amounts, that is, the flow rate and the pressure of the reactive gases, received from the cooperative control ECU 121, and outputs the command signal that indicates the opening and closing operation of the exhaust pressure valves 146 and 146.

The power storage apparatus 114 is, for example, a capacitor comprising a two layer electrical capacitor, a electrolytic capacitor, or the like. In addition, the fuel cell 112 and the power storage apparatus 114 are connected serially to the motor 131 for travel and the like, which are the electrical loads.

The electrical power distribution system 115 is, for example, a high voltage distributor, and controls the current value supplied to the electrical loads such as the motor 131 for travel based on the command signal from the electrical power distribution control ECU 124.

The cooling unit 116 is, for example, a water circulation system that cools the motor 142, the fuel cell 112 or the like that drives the motor 131 for travel, and the air compressor 141, and is formed comprising a water pump or the like that supplies cooling water.

The ECU 117 is formed comprising a plurality of ECUs 121, ..., 125 connected together via a network 151.

The cooperative control ECU 121 that acts as a server apparatus controls the cooperative operation of a plurality of subsystems that act as client apparatuses, such as a motor control ECU 122, a reactive gas supply control ECU 123, an electrical power distribution control ECU 124, and a cell voltage detection control ECU 125.

Here, each of he ECUs 122, ..., 125 that form each of the subsystems, as will be described below, carry out control of the I/O processing for the control signal sent and received between the cooperative control ECU 121 and the controlled objects or the control of shut down processing and protective operation such as the avoidance processing during the occurrence of abnormalities such as a network stoppage, and the cooperation control ECU 121 carries out the control operation for controlling each of the ECUs 122, ..., 115 based on a control signal obtained from the I/O processors of each of the ECUs 112, ...,125.

As shown in FIG. 3, for example, the cooperative control ECU 121 is formed comprising an MPU 161, a communication controller 162, and a program writing control unit 163.

The MPU 161 receives each of the control signals after I/O processing from each of the ECUs 112, ..., 125 that act as a plurality of subsystems via the communication controller 162, and based on these control signals, carries out the control operation for cooperatively operating each of the ECUs 122, ..., 125.

In addition, the program writing control unit 163 controls the writing operation when the content of the cooperative operation of each of the ECUs 112, ..., 125 or the like is modified or the appropriate program writing apparatus 65 modifies the operation content of the MPU 161 externally.

As shown in FIG. 4, for example, each of the ECUs 122, ..., 125 that act as a plurality of subsystems is formed comprising an MPU 171, a communication controller 172, a program writing control unit 173, an input circuit 174, and an output circuit 175.

The MPU 171 provides an I/O processing unit 171a that carries out I/O processing that comprises predetermined conversion processing or the like for the signals received from the external sensor switches 176 or the like via the input circuit 174 and the control signals received from the cooperative control ECU 121 via the communication controller 172, and the signals from the input circuit 174 are sent to the cooperative control ECU 121 via the communication controller 172, and the control signals from the cooperative control ECU 121 are output to the actuator 177 via the output circuit 175.

Furthermore, the MPU 171 comprises an autonomous control unit 171b that independently controls the shut down operation of the controlled objects of the reactive gas supply unit 113 and the like, the protective operations of the fuel cell 112, or the like, and for example, outputs to the actuator 177 a control signal during the occurrence of an abnormality such as the stoppage of the network 151.

Moreover, the program writing control unit 173 controls the writing operation when the processing content of the I/O operation in the MPU 171 or the like is modified.

Below, the functions of each of the cooperative control ECU 121 and the ECUs 122, ..., 125 that form a plurality of subsystems will be explained.

The motor control ECU 112 controls the power conversion operation of the PWM inverter provided in the PDU 132, and outputs to the PDU 132 each of the alternating current voltage command values, for example, of the U phase, the V phase, and the W phase as switching commands by referring to a predetermined control map based the motor control amounts, for example, the required torque value and the motor output, received from the cooperative control ECU 121. In addition, the U phase current, the V phase current, and the W phase current are output to each phase of the motor 131 for travel depending on each of these voltage command values.

The reactive gas supply control ECU 123 outputs control signals for maintaining the desired rotation speed to, for example, an air compressor 141 by referring to a predetermined control map based on the flow rate and pressure of the reactive gases, that is, the oxygen gas and the air, received from the cooperative control ECU 141 and supplied to the fuel cell 112, and outputs a control signal for controlling the aperture of the controllable exhaust valve 46 depending on a stepping motor or the like.

The electrical power distribution control ECU 124 sends signals for the output current and the output voltage output from the power storage apparatus 112 and signals for the output current, voltage between terminals, and temperature output from the power storage apparatus 114 and the like to the cooperative control ECU 121 by carrying out predetermined I/O processing, and at the same time carries out switching control of the power supply based on an electrical power distribution control signal received from the cooperative control ECU 121 and for example a control signal that indicates the operation of a high voltage distributor or the like.

The cell voltage detecting control ECU 125 monitors the voltage values of the plurality of cells that form the fuel cell 112, calculates, for example, the average value, standard deviation, and maximum and minimum values of the voltage value detected for the plurality of cells, and sends the results to the cooperative control ECU 121.

Figure 5:
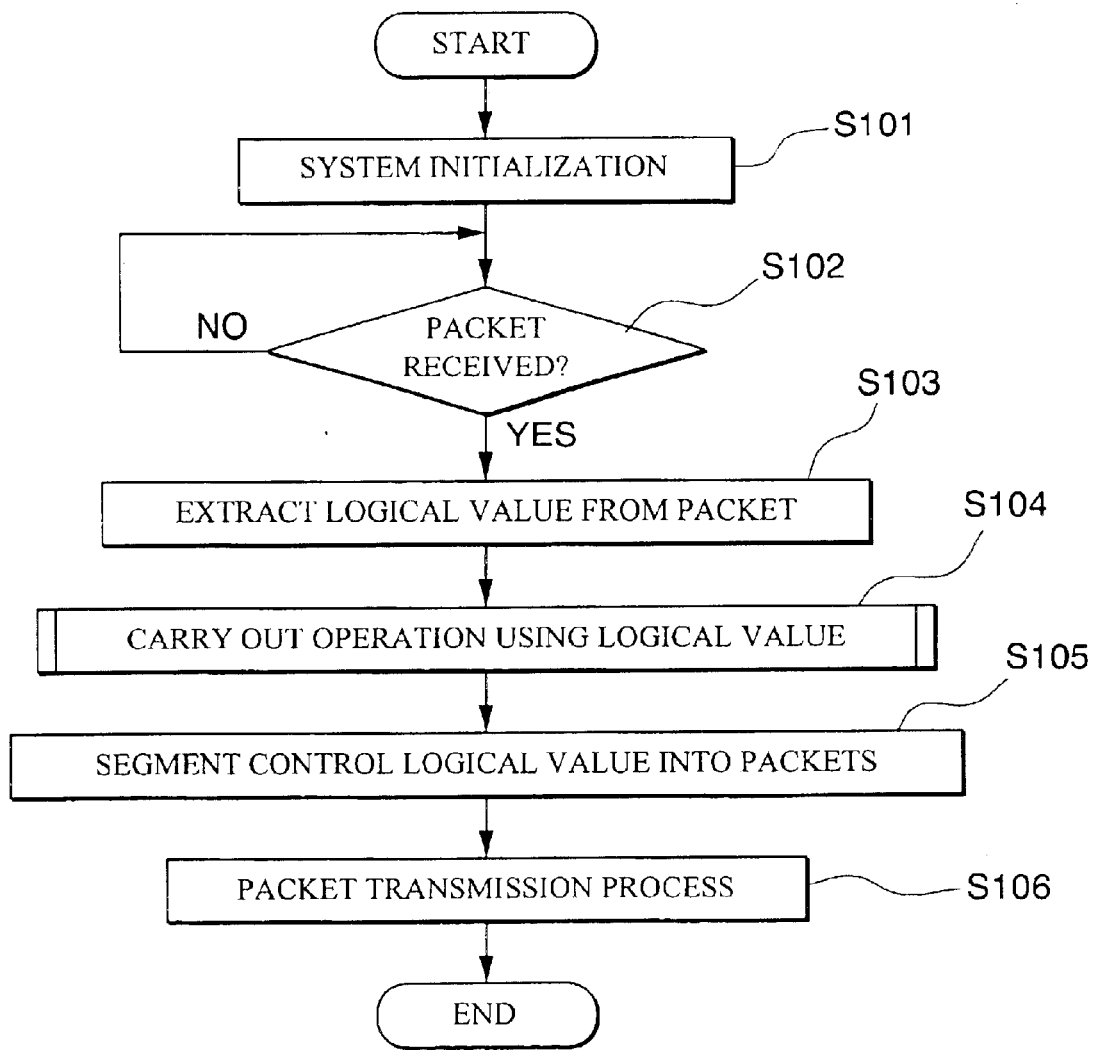
FIG. 5 is a flow chart showing the operations of a cooperative control ECU.
Figure 6:
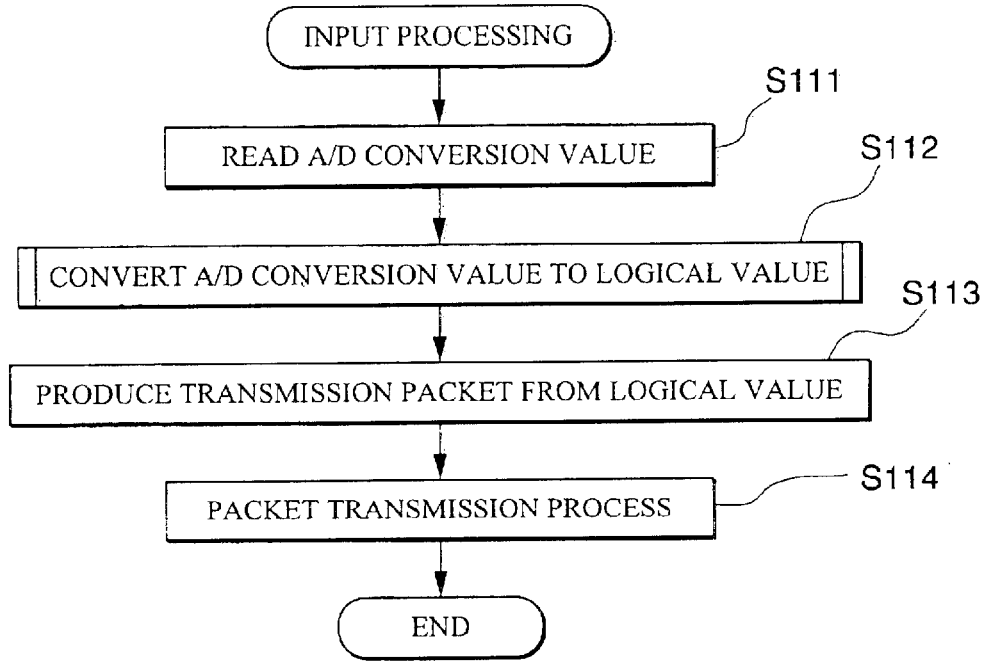
FIG. 6 is a flow chart showing the operations, in particular, the input processing, of each of the ECUs that act as a plurality of sub-systems.
Figure 7:
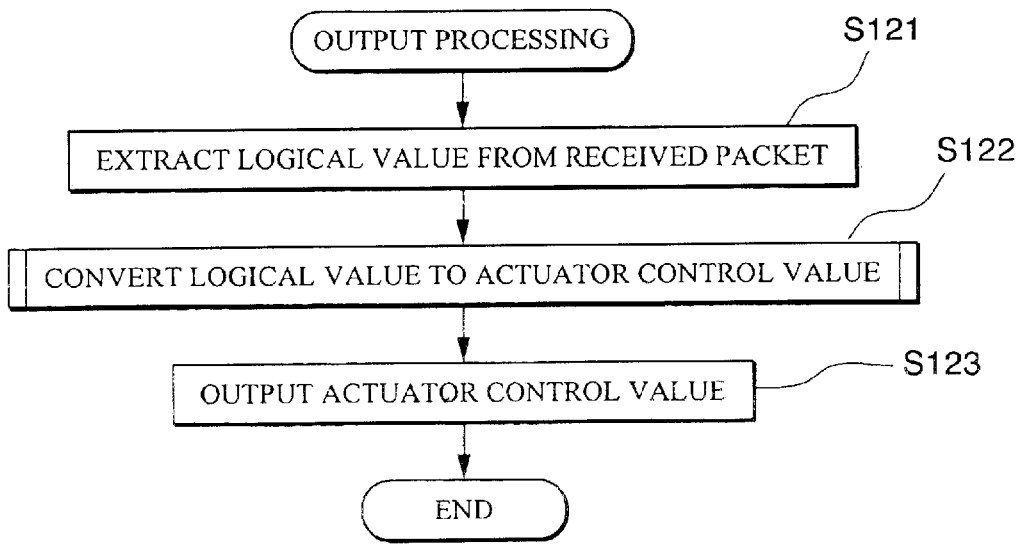
FIG. 7 is a flowchart showing the operations, in particular, the output processing, of each of the ECUs that act as a plurality of sub-systems.

The vehicle control system 110 according to the present embodiment comprises the structure described above. Next, the operation of this vehicle control system 110 will be explained while referring to the figures. FIG. 5 is a flowchart showing the operation of the cooperative control ECU 121, FIG. 6 is a flowchart showing the operation, in particular, the input processing, of each of the ECUs 122, . . . , 125 that act as a plurality of subsystems, and FIG. 7 is a flowchart showing the operation, in particular, the output processing, of each of the ECUs 112, . . . , 125 that act as a plurality of subsystems.

Below, the operation of the cooperative control ECU 121 will be explained.

First, in step S 101 shown in FIG. 5, for example, suitable control values, constants, and the like are set, which comprise the initialization processing of the system.

Next, in step S 102, it is determined whether or not packets of control signals have been received via the network 115 from each of the ECUs 112, . . . , 125 that act as a plurality of subsystems.

In the case that the result of the determination is NO, the processing proceeds to step S 102.

In the case that the result of the determination is YES, the processing proceeds to step S 103.

In step S 103, the logical values are extracted from the received packets.

Moreover, the logical values are physical measurements having high generality, abstract control values, or the like that are the control signals sent and received between the cooperative control ECU 121 and each of the ECUs 122, . . . , 125, and for example, the values are set such that there will be no effect even in the case that the actuator 177 is modified. For example, when controlling the speed of the air compressor 141 at a predetermined revolution, the actually necessary operational command value is the voltage value and current value supplied to the motor 142, but in the end, what is required in the system is the flow rate value of the reactive gas, and for example, these are unchanging values even in the case, for example, that the air compressor 141 and the motor 142 are changed to another apparatus.

In addition, in step S 104, the control operation is carried out based on the extracted logical values, and control logic values comprising physical measurements that have a high generality, abstract control values, and the like are calculated.

Next, in step S 106, the control logic values for controlling each of the ECUs 122, . . . , 125 that act as a plurality of subsystems are segmented into packets.

Additionally, in step S 105, the packets are sent to each of the ECUs 122, . . . , 125 that act as a plurality of subsystems, and the sequence of processing is ended.

For example, in the fuel cell vehicle 101 according to the present embodiment, first the value of the openness of the accelerator is read by the cooperative control ECU 121.

The cooperative control ECU 121 calculates the necessary motor control amount, the required torque value, the motor output, and the like from the value of the accelerator openness, and outputs the necessary torque value, the motor output, and the like to the motor control ECU 122.

Furthermore, the cooperative control ECU 121 calculates the amount of power corresponding to the calculated necessary torque value, motor output, and the like, calculates the reactive gas control amount, for example, the flow rate and pressure of the hydrogen gas and air, necessary to output this amount of power, and sends the results to the reactive gas supply control ECU 123.

In addition, the cooperative control ECU 121 sends to the electrical power distribution control ECU 124 the electrical power distribution control signals depending on the operational condition of the fuel cell vehicle 1, for example, the idle drive state, or the like.

Furthermore, the cooperative ECU 121 determines whether or not the fuel cell is operating normally based on the detected values of the average value, standard deviation, and the maximum and minimum values of the voltage values for the plurality of cells received from the cell voltage detection control ECU 125.

Below, the input processing of each of the ECUs 122, . . . , 125 that act as a plurality of subsystems will be explained.

First, in step S 111 shown in FIG. 6, the A/D conversion value of the detected signals or the like received from an external sensor switch 176 or the like via the input circuit 174 is read.

Next, in step S 112, the A/D conversion value is converted into a logical value.

Next, in step S 113, a transmission packet is produced from the logical value.

In addition, in step S 114, the packet is sent to the cooperative control ECU 121, and the sequence of processing ends.

Below, the output processing each of the ECUs 112, . . . , 125 that act as a plurality of subsystems will be explained.

First, in step S 121 shown in FIG. 7, a logical value is extracted from the packet received from the cooperative control ECU 121.

Next, in step S 122, the extracted logical value is converted into a control value for the actuator 177.

Next, in step S 123, the control value for the actuator 177 is output via the output circuit 175, and the sequence of processing ends.

In the fuel cell vehicle 101 according to the present embodiment, for example, the motor control ECU 122 that has received from the cooperative ECU 121 the necessary torque value, the motor output value (the logical value in step S 121), and the like as motor control amounts refers to a predetermined control map and outputs to the PDU 132 an alternating current voltage command value (the control value in step S 122) for the U phase, the V phase, and the W phase as switching commands for controlling the power conversion operation of the PWM inverter and the like provided in the PDU 132.

In addition, the reaction gas supply control ECU 123 that has received from the cooperative control ECU 121 the control signal for the flow rate and pressure (the logical values of step S 121) as reaction gas control amounts obtains a predetermined output by controlling the flow rate of the reactive gas supplied to the fuel cell 112, and at the same time maintains the desired generation efficiency by setting the differential pressure between the hydrogen electrode and the air electrode of the fuel cell 112 to a desired pressure. Specifically, a predetermined control map is referred to, and, for example, the current value and the voltage value (the control value in steps S 122) for maintaining a desired rotation speed for the air compressor 141 are calculated and output. At the same time, the current value and the voltage value (the control values in step S 122) for maintaining the desired valve aperture for the stepping motor or the like of the exhaust pressure valve are calculated and output.

Furthermore, the electrical power distribution control ECU 124 that has received from the cooperative control ECU 121 the electrical power distribution control signal (the logical value in step S 121) outputs a control signal (the control value in step S 122) for controlling the high voltage power distributor or the like of the electrical power distribution unit 115.

Below, in particular the processing of the shut down of each of the ECUs 122, . . . , 125 during a stoppage of the network 115, will be explained while referring to the figures as an operation of the vehicle control system 110.

Figure 8:
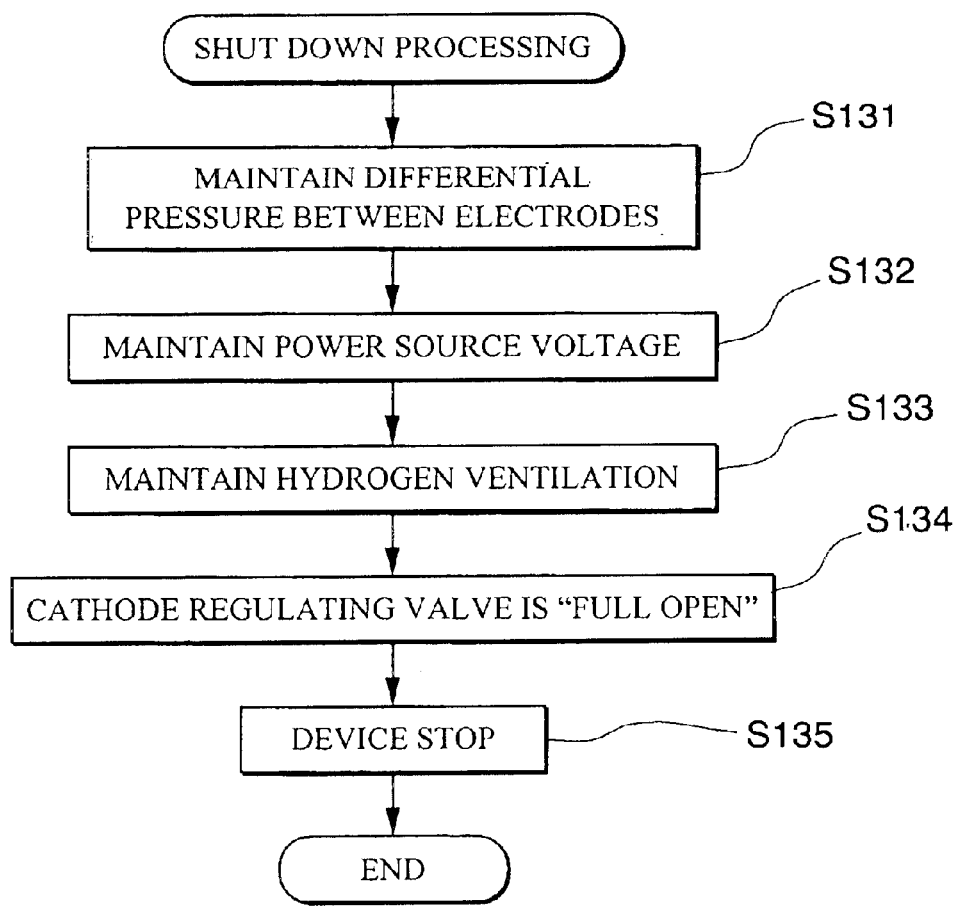
FIG. 8 is a flowchart showing the operations, in particular, the input processing, of each of the ECUs that act as a plurality of sub-systems.

FIG. 8 is a flowchart showing the operation of each of the ECUs 122, . . . , 125 that act as a plurality of subsystems, and in particular, the shut down processing during the occurrence of an abnormal state such as a network stoppage.

First, when, for example, the occurrence of an abnormal state such as the stoppage of the network 151 is detected by determining whether or not a state of communication can be established within a predetermined time interval between the cooperative control ECU 121 and each of the ECUs 122, . . . , 125, in step S 131 shown in FIG. 8, the reactive gas supply control ECU 123 carries out differential pressure maintenance between electrodes. Specifically, the occurrence is prevented, for example, by immediately closing the exhaust pressure valve 146, immediately increasing the rotation speed of the air compressor 141, and the like, and thereby an abnormal pressure acting on the solid polymer electrolytic film of the fuel cell 112 is prevented.

Next, in step S 132, the power source voltage for the auxiliary drive is maintained, and the stoppage operation of the system is begun.

Next, in step S 133, the reactive gas supply control ECU 123 maintains the ventilating operation of the hydrogen gas, and prevents the hydrogen gas from accumulating in the system.

Next, in step S 134, the reactive gas supply control ECU 123 opens the exhaust valve 146 on the cathode side of the fuel cell, and thereby the pressure of the reactive gas supplied to the fuel cell 112 is decreased.

Next, in step S 135, the devices such as the motor 131 for travel and the air compressor 141 are stopped, and the sequence of processing ends.

As described above, according to the vehicle control system 110 according to the present embodiment, when each of the ECUs 122, . . . , 125 that act as a plurality of subsystems are cooperatively controlled by the cooperative control ECU 121 that acts as the server apparatus, only the I/O processing for the control signals sent to and received from the cooperative control ECU 121 and the shut down operation of the controlled object during the abnormal operation are controlled in each of the ECUs 122, . . . , 125, and control operation for determining the operation of each of the controlled objects dependent on each of the ECUs 122, . . . , 125 is carried out in the cooperation control ECU 121.

Thereby, in the case that the control method of the vehicle control system 110 is modified, only the processing content of the cooperative control ECU 121 needs to be modified, and the complicated labor of adjusting and modifying the processing contents of each of the ECUs 122, . . . , 125 in association with each other can be eliminated.

In addition, for example, in the case that the actuator 177 connected to each of the ECUs 122, . . . , 125 is modified, only the content of the I/O processing at each of the ECUs 122, . . . , 125 needs to be modified, and there is no need to modify the control content in the cooperative control ECU 121, and thus the updating of the vehicle control system 110 can be carried out easily.

Furthermore, even in the case that cooperative control of each of the ECUs 122, . . . , 125 by the cooperative control ECU 121 becomes impossible due to the occurrence of an abnormality in the network 151, each of the ECUs 122, . . . , 125 can operate independently, and thus it is possible to prevent carrying out erroneous control of an controlled object during the occurrence of an abnormality in the network 151.

Moreover, in the present embodiment, the vehicle control system 110 is installed in a fuel cell vehicle 101, but it is not limited thereby, and can also be installed in other vehicles such as a hybrid vehicle.

In addition, in the present embodiment, the power storage apparatus 114 is a capacitor, but it is not limited thereby, and can also be a battery or the like. In this case, the electrical power distribution control ECU 124 controls the remaining capacity of the battery while carrying out electrical power distribution control.

Moreover, in the present embodiment, in the ECU 117, a plurality of subsystems acting as clients in the ECU 117 was formed comprising a motor control ECU 122, a reactive gas supply control ECU 123, an electricity distribution control ECU 124, and a cell voltage detection control ECU 125, but it is not limited thereby, and can be structured comprising other control ECUs. In short, each of the ECUs interconnected with the cooperative control ECU 121 via a network 151 can carry out I/O processing for converting the control values sent to and received from the cooperative control ECU 121 to the logical values, and at the same time, can be structured such that they can control the protective operations for shut downs and the like independently, without depending on other ECUs, for example, during the occurrence of an abnormality such as the stoppage of the network 151.

Moreover, in the present embodiment, each of the ECUs 122, . . . , 125 that act as a plurality of subsystems operate independently during the stoppage of the network 151, but it is not limited thereby, and for example, in the case that an abnormal control signal is sent from the cooperative control ECU 121, this control signal is ignored, and operation is carried out independently.

Second Embodiment

Below, a second embodiment of the vehicle control system of they present invention that solves the second problem will be explained while referring to the figures. In this second embodiment, structural elements which are identical to the above-described first embodiment are indicated with the same references. In addition, in this second embodiment, cooperative control ECU 121 shown in FIG. 1 is replaced by cooperative control ECU 221; ECUs 122, . . . , 125 in FIG. 1 are respectively replaced by ECUs 222, . . . , 225; and WECU 117 in FIG. 1 is replaced by ECU 217. FIG. 9 is a block diagram of the functions of the cooperative control ECU 221; and FIG. 10 is a block diagram of the functions of each of the ECUs 222, . . . , 225 that act as a plurality of subsystems.

The fuel cell vehicle 101 according to the present embodiment serves as a power source apparatus that supplies power to the motor drive unit 111 for travel and comprises a hybrid power source apparatus formed, for example, from fuel cell 112, a reactive gas supply unit 113, and a power storage apparatus 114. The drive power for the motor drive unit 111 for travel that has power supplied via an electrical power distribution unit 115 from these power source apparatuses is sent to the drive wheels W via a transmission system (not illustrated) such as an automatic transmission or a manual transmission.

In addition, when the drive power is sent to the motor drive unit 111 for travel side from the drive wheel W side during the deceleration of the fuel cell vehicle 101, the motor drive unit 111 for travel functions as a generator, and the kinetic energy of the vehicle body is recovered as electrical energy by what is known as regenerative breaking.

The vehicle control system 110 according to the present embodiment is formed comprising, for example, a motor drive unit 111 for travel, a fuel cell 112, a reactive gas supply unit 113, a power storage apparatus 114, an electrical power distribution unit 115, cooling units 116 and 116, and an ECU 217.

Furthermore, the ECU 217 is formed comprising a cooperative control unit ECU 221 that acts as what is termed a server, and a plurality of subsystems that act as what is termed a client apparatus, for example, the motor control ECU 222, a reactive gas supply control ECU 223, an electrical power distribution control ECU 224, and a cell voltage detection control ECU 225.

As shown in FIG. 2, the motor drive unit 111 for travel is formed comprising, for example, a motor 131 for travel that acts as a permanent magnet-type three phase alternating current synchronous motor that uses a permanent magnet to provide a magnetic field, and a PDU 132, and the motor 113 for travel is driven and controlled by the three phase alternating current supplied form the PDU 132.

The PDU 132 provides a PWM inverter formed from switching elements such as insulated-gate bipolar transistors (IGBT), and based on the switching command output from the motor control ECU 222, the direct current power output via the electrical power distribution unit 115 from the fuel cell 112 and the power storage apparatus 114 is converted to three phase alternating current, and supplied to the motor 131 for travel.

The fuel cell 112 comprises a stack formed by layering a plurality of cells that are formed by sandwiching a solid polymer electrolyte film comprising a solid polymer ion exchange film or the like between an anode and cathode, and providing a hydrogen electrode that supplies hydrogen gas as a fuel and an air electrode that supplies air that includes oxygen as an oxidizing agent. In addition, the hydrogen ions generated by the catalytic reaction at the anode move to the cathode by migrating through the solid polymer electrolyte layer where they undergo an electrochemical reaction with the oxygen to generate power.

The reactive gas supply unit 113 is formed comprising an air supply unit 213a that supplies air to the air electrode of the fuel cell 112 and a hydrogen supply unit 113b that supplies hydrogen gas to the hydrogen electrode. Furthermore, the air supply unit 113 a is formed comprising an air compressor 141, a motor 142 that drives the air compressor 141, and a driver 143 for the motor 142.

In addition, the hydrogen supply unit 113b is formed comprising a pressure control valve 144 that supplies hydrogen gas under pressure depending on the pressure of the air that is supplied as a signal pressure from the air compressor 141 and an ejector 145 that mixes the exhaust gas discharged from the fuel cell 111 with the hydrogen gas supplied via the pressure control valve 144, and recirculates it.

Moreover, on the respective air electrode side and the hydrogen electrode side of the fuel cell 112, exhaust valves 146 and 146 for discharging each of the exhaust gasses, that is, the air and hydrogen gas, discharged form the fuel cell 112 to the outside are provided, and furthermore, a pressure gauge 147 that detects the pressure of the air at the air electrode of the fuel cell 112 is provided, and at the hydrogen electric side of the fuel cell 112, both a pressure meter 147 that detects the pressure of the hydrogen gas and flow meter 148 that detects the rate of flow of the hydrogen gas are provided.

In addition, the reactive gas supply control ECU 223 receives each of the detected values detected at both the pressure gauges 147 and 147 and the flow meter 148, and as will be described below, outputs them to the cooperative control ECU 221 after carrying out I/O processing. Furthermore, the reactive gas supply control ECU 223 outputs a control signal for maintaining the desired rotation speed to the air compressor 141 depending on the reactive gas control amount, that is, the flow rate and pressure of the reactive gas, received from the cooperative control ECU 221, and outputs a command signal designating the opening and closing operation of the exhaust valves 146 and 146.

The power storage apparatus 114 is, for example, a capacitor comprising an electrical two-layer capacitor or an electrolytic capacitor. In addition, the fuel cell 112 and the power storage apparatus 114 are connected in series to the motor 131 for travel, which is the electrical load, and the like.

The electrical power distribution unit 115 is, for example, a high voltage distributor, and based on a command signal from the electrical power distribution control ECU 224, controls the current value supplied to the electrical loads such as the motor 131 for travel and the like.

The cooling unit 116 acts as a water circulation system that cools the motor 131 for travel, the motor 142 that drives the air compressor 141, the fuel cell 112 and the like, and is formed comprising a water pump and the like that supplies cooled water.

The ECU 217 is formed comprising a plurality of ECUs 221, . . . , 225 that are connected together via a network 151.

The cooperative control ECU 221 that acts as a server apparatus controls the cooperative operation of a plurality of subsystems that act as client apparatuses, such as the motor control ECU 222, the reactive gas supply control ECU 223, the electrical power distribution control ECU 224, and the cell voltage detection control ECU 225.

Here, as will be described below, each of the ECUs 222, . . . , 225 that comprise the respective subsystems carry out control such as the I/O processing of the control signals sent and received between the cooperative control ECU 221 and the controlled object and shut down processing and protective operations during the occurrence of an abnormality such as a network stoppage, and at the same time, assigns a priority to data sent and received between the cooperative control ECU 221 and the controlled object, thereby carrying out sending and receiving of data depending on the priority.

The cooperative control ECU 221 carries out control operation for controlling each of the ECUs 222, . . . , 225 based on control signals obtained from the I/O processing of each of the ECUs 222, . . . , 225.

For example, as shown in FIG. 9, the cooperative ECU 221 is formed comprising the MPU 261 and the communication controller 262.

The MPU 261 receives each of the control signals after I/O processing from each of the ECUs 222, . . . , 225 that act as a plurality of subsystems via the communication controller 262, and carries out control operation for cooperatively operating each of the ECUs 222, . . . , 225 based on these control signals.

For example, as shown in FIG. 10, each of the ECUs 222, . . . , 225 that act as a plurality of subsystems is formed comprising an MPU 271, a communication controller 272, an input circuit 274, an output circuit 275, a packet data generating unit 281, a message generating unit 282, and a plurality of FIFOs, such as the priority FIFO 283 and the non-priority FIFO 283.

The MPU 271 carries out control I/O processing comprising predetermined conversion processing and the like for signals received from the external sensor switch 276 and the like via the input circuit 274 and control signals received from the cooperative control ECU 221 via the communication controller 272. The signal from the input circuit 274 is sent to the cooperative control ECU 221 via the communication controller 272 and the control signal from the cooperative control ECU 221 is output to the actuator 277 via the output circuit 275.

Furthermore, the MPU 271 can independently control the shut down operation for the controlled objects such as the reactive gas supply unit 113, the protective operation for the fuel cell 112, or the like, and for example, outputs a control signal during the occurrence of an abnormality such as the stoppage of the network 251 and the like to the actuator 277.

The packet data generating unit 281 generates packet data by segmenting into packets a sequence of data to be sent to the cooperative control ECU 221 and each of the other ECUs 222, . . . , 225 via the network 151. In this case, based on the priority order in terms of the control of the data to be sent, a predetermined priority for each of the packet data is assigned. For example, either priority packet data or non-priority packet data is assigned to each of the packet data.

For example, data for monitoring whether the state of the system is normal becomes non-priority packet data. Examples are data that can be classified as control rates having a relatively slow response, or data related to the voltage values of the plurality of cells that from the fuel cell 112 which have a relatively low priority.

In contrast, data that can be classified as control amounts that have a relatively fast response can be made high priority packet data. Examples are data related to pressure received from the reactive gas supply unit 113 and data related to the motor output received from the motor drive unit 111 for travel.

The message generating unit 282 generates messages by partitioning as necessary the generated packet data into predetermined sizes that can be handled by the communication protocol, for example, a data size that can be sent in one transmission.

The priority FIFO 283 stores messages formed from priority packet data, and the non-priority FIFO 284 stores messages formed from non-priority packet data.

Moreover, below the functions of the cooperative control ECU 221 and each of the ECUs 222, . . . , 225 that act as a plurality of subsystems will be explained.

The motor control ECU 222 controls the electric power conversion action of the PWM inverter provided in the PDU 132, and referring to a predetermined control map based on motor control values such as the necessary torque value and the like received from the cooperative control ECU 221, outputs to the PDU 132 each of the alternating current voltage command values of, for example, the U phase, the V phase, and the W phase as switching commands. In addition, the U phase current, V phase current, and the W phase current are output to each phase of the motor 131 for travel depending on each of these voltage command values.

The reactive gas supply control ECU 223 refers to a predetermined control map based on the reactive gas control amounts, for example, the flow rate and pressure of the reactive gases, that is, the hydrogen gas and the air, supplied to the fuel cell 112, and received from the cooperative control ECU 221, and controls the valve aperture of the adjustable exhaust valve 146 by, for example, the rotation speed of the air compressor 141 or a stepping motor.

The electric power distribution ECU 224 carries out a predetermined I/O processing on the signal for the output current and output voltage output from the fuel cell 112, the signal for the output current output from the power storage apparatus 114 and the voltage and temperature between terminals, and the like, and sends them to the cooperative control ECU 221, and at the same time carries out switching control of the power supply based on electric power distribution control signals received form the cooperative control ECU 221 and the control signals that indicate the operation of, for example, the high voltage distributor.

The cell voltage detection control ECU 225 monitors the voltage value of the plurality of cells that form the fuel cell 112, calculates the average value, standard deviation, maximum, and minimum values for the voltage values detected for a plurality of cells, and outputs them to the cooperative control ECU 221.

Figure 11:
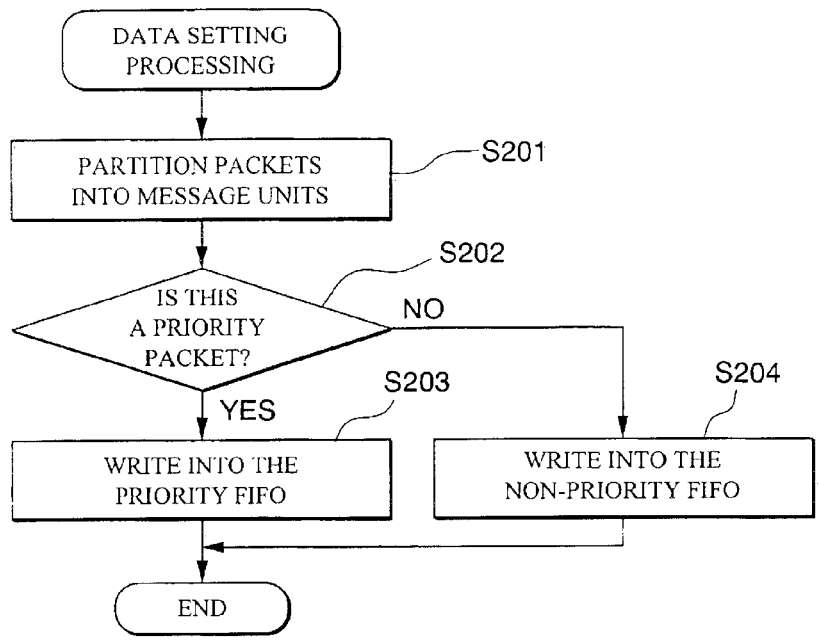
FIG. 11 is a flowchart showing the operations, in particular, the data setting processing, of each of the ECUs that act as a plurality of sub-systems.
Figure 12:
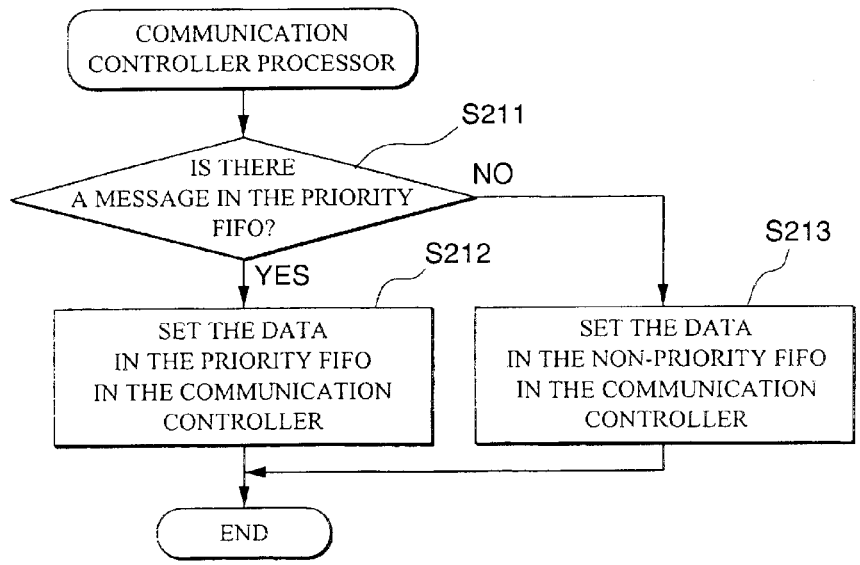
FIG. 12 is a flowchart showing the operations, in particular, the processing of data transmission to the communication controller, of each of the ECUs that act as a plurality of sub-systems.

The vehicle control system 110 according to the present embodiment provides with the structure described above, and next, the operation of this vehicle control system 110 will be explained referring to the drawings. FIG. 11 is a flowchart showing the operation of each of the ECUs 222, . . . , 225 that act as a plurality of subsystems, and in particular the data setting processing, and FIG. 12 is a flowchart showing the operation of each of the ECUs 222, . . . , 225 that act as a plurality of subsystems, in particular, the processing of data transmission to the communication controller 272.

Below, the data setting processing in each of the ECUs 222, . . . , 225 that act as a plurality of subsystems will be explained while referring to the drawings.

First, in step S 201 shown in FIG. 11, packet data is generated by segmenting into packets a sequence of data to be sent to the cooperative control ECU 221 and each of the other ECUs 222, . . . , 225 via the network 151, and furthermore, messages are generated by partitioning the packet data as necessary.

Next, in step S202, it is determined whether or not the generated message is a packet assigned a high priority, that is, whether it is priority packet data.

In the case that the result of this determination is YES, the processing proceeds to step S203. In contrast, in the case that the result of this determination is NO, the processing proceeds to step S204.

In step 203, priority packet data is stored in the priority FIFO 283, and the sequence of processing ends.

In step S204, non-priority packet data is stored in the non-priority FIFO 284, and the sequence of processing ends.

Below, the processing of data transmission to the communication controller 272 of each of the ECUs 222, ..., 225 that act as a plurality of subsystems will be explained while referring to the drawings.

First, in step S211 shown in FIG. 12, it is determined whether or not a message is stored in the priority FIFO 283.

In the case that the result of the determination is YES, the processing proceeds to step S212. In contrast, in the case that the result of the processing is NO, the processing proceeds to step S213.

In step S 212, the data stored in the priority FIFO 283 is sent to the communication controller 272, and the sequence of processing ends.

In step S213, the data stored in the non-priority FIFO 284 is sent to the communication controller 272, and the sequence of processing ends.

As explained above, according to the vehicle control system of the present embodiment, when data is sent via the network 151 to the cooperative control ECU 221 that acts as a server apparatus and to each of the ECUs 222, ..., 225 that act as a plurality of subsystems, data used in immediate control such as the output of the motor 111 for travel and the pressure of the reactive gas supplied to the fuel cell 112 are classified as a sequence of packet data assigned a high priority, and sent with priority.

Thereby, for controlled objects that require immediate control, by reducing the transmission waiting time for packet data, reducing the transmission delay becomes possible, and even in the case that, for example, real time processing is required, a client-server real time processing system can easily be constructed.

Moreover, in the present embodiment, in the packet data generating unit 281, the priority of packet data is assigned, but it is not limited thereby, and for example, in the message generating unit 282, in the case that the size of the packet data is smaller than a predetermined size that can be handled by the communication controller, that is, the data size that can be sent in one transmission, it is not necessary to partition the packet data and then generate the message, and this packet data can be made a priority packet data and stored in the priority FIFO 283.

Moreover, in the present embodiment, the vehicle control system 110 was mounted in a fuel cell vehicle 101, but it is not limited thereby, and it can be mounted in other vehicles such as a hybrid vehicle or the like.

In addition, in the present embodiment, the power storage apparatus 114 was a capacitor, but it is not limited thereby, and for example, a battery can be used. In this case, the electrical power distribution control ECU 224 can control the remaining capacity of the battery while carrying out electrical power distribution.

Moreover, in the present embodiment, in the ECU 217, the plurality of subsystems that act as client apparatuses were formed comprising a motor control ECU 222, a reactive gas supply control ECU 223, an electrical power distribution control ECU 224, and a cell voltage detection control ECU 225, but it is not limited thereby, and can be formed comprising other control ECUs. In short, each of the control ECUs that are connected together with the cooperative control ECU 221 via the network 151 can be formed so as to carry out I/O processing for converting control values sent to and received from the cooperative control ECU 221 to logical values, and at the same time, during the occurrence of an abnormality such as the stoppage of the network 151, can control protective operations such as shutdown processing independently, without depending on other ECUs.

Moreover, in the present embodiment, each of the ECUs 222, ..., 225 that act as a plurality of subsystems are provided with a priority FIFO 283 and a non-priority FIFO 284, but it is not limited thereby, and a plurality of FIFOs can be provided in the cooperative control ECU 221, and depending on the priority of the sent data, the data can be temporarily stored in different FIFOs, and then the data sent in order of their priority.

Third Embodiment

Below, a third embodiment of the vehicle control system of the present invention for resolving the third problem will be explained while referring to the drawings. In this third embodiment, the structural elements which are identical to the above-described first embodiment or second embodiment are identical with the same reference numbers. In addition, in this embodiment, cooperative control ECU121 shown in FIG. 1 is replaced by a cooperative control ECU 321; ECUs 122, ..., 125 in FIG. 1 are respectively replaced by ECU2 322, ..., 325; ECU 117 in FIG. 1 is replaced by ECU 317.

The fuel cell vehicle 101 provided with the vehicle control system 110 according to the present embodiment provides a hybrid power source apparatus comprising, for example, a fuel cell 112, a reactive gas supply unit 113, and a power storage apparatus 114 as a power source apparatus that supplies power to the motor drive unit 111 for travel. The drive power of the motor drive unit 111 for travel that supplies power via the electrical power distribution unit 115 from these power source apparatuses is sent to the drive wheels W via a transmission (not illustrated) such as an automatic transmission or a manual transmission.

In addition, when the drive power is sent to the motor drive unit 111 for travel from the drive wheel W side during the deceleration of the fuel cell vehicle 101, the motor drive unit 111 for travel functions as a generator, and the kinetic energy of the vehicle body is recovered as electrical energy by what is known as regenerative breaking.

The vehicle control system 110 according to the present embodiment is formed comprising, for example, a motor drive unit 111 for travel, a fuel cell 112, a reactive gas supply unit 113, a power storage apparatus 114, an electrical power distribution unit 115, cooling units 116 and 116, and an ECU 317.

Furthermore, the ECU 317 is formed comprising a cooperative control unit ECU 321 that acts as what is termed a server, and a plurality of subsystems that act as what is termed a client apparatus. The plurality of subsystems comprises, for example the motor control ECU 322, a reactive gas supply control ECU 323, an electrical power distribution control ECU 324, and a cell voltage detection control ECU 325.

The motor drive unit 111 for travel is formed comprising, for example, a motor for travel (not illustrated) that acts as a permanent magnet-type three phase alternating current synchronous motor that uses a permanent magnet to provide a magnetic field, and based on the motor control amount output from the motor control ECU 322, direct current output via the electrical power distribution system 115 from the fuel cell 112 and the power storage apparatus 114 is converted to three phase alternating current power, and supplied to the motor for travel.

The fuel cell 112 comprises a stack formed by layering a plurality of cells that are formed by sandwiching a solid polymer electrolyte film comprising a solid polymer ion exchange film or the like between an anode and cathode, and providing a hydrogen electrode that supplies hydrogen gas as a fuel and an air electrode that supplies air that includes oxygen as an oxidizing agent. In addition, the hydrogen ions generated by the catalytic reaction at the anode move to the cathode by migrating through the solid polymer electrolyte layer where they undergo an electrochemical reaction with the oxygen to generate power.

The reactive gas supply unit 113 is formed comprising an air supply unit (not illustrated) that supplies air to the air electrode of the fuel cell 112 and a hydrogen supply unit (not illustrated) that supplies hydrogen gas to the hydrogen electrode.

Moreover, on the respective air electrode side and the hydrogen electrode side of the fuel cell 112, exhaust valves (not illustrated) for discharging each of the exhaust gasses, that is, the air and hydrogen gas, discharged from the fuel cell 112 to the outside are provided, and furthermore, a pressure gauge (not illustrated) that detects the pressure of the air at the air electrode side of the fuel cell 112 is provided, and at the hydrogen electrode side of the fuel cell 112 both a pressure meter (not illustrated) that detects the pressure of the hydrogen gas and flow meter (not illustrated) that detects the rate of flow of the hydrogen gas are provided.

In addition, the reactive gas supply control ECU 323 receives each of the detected values detected at both the pressure gauges and the flow meter, and outputs them to the cooperative control ECU 321. Furthermore, the reactive gas supply control ECU 323 outputs a command signal for designating the desired rotation speed to the air compressor depending on the reactive gas control amount, that is, the flow rate and pressure of the reactive gas, received from the cooperative control ECU 321, and the opening and closing operation of the exhaust valves 146 and 146 is output.

The power storage apparatus 114 is, for example, a capacitor comprising an electrical two-layer capacitor or an electrolytic capacitor. In addition, the fuel cell 112 and the power storage apparatus 114 are connected in series to the motor 131 for travel, which is the electrical load, and the like.

The electrical power distribution unit 115 is, for example, a high voltage distributor, and based on a command signal from the electrical power distribution control ECU 324, controls the current value supplied to the electrical loads such as the motor 111 for travel and the like.

The cooling unit 116 is a water circulation system that cools the motor for travel, the fuel cell 112 and the like, and is formed comprising a water pump and the like that supplies cooled water.

The ECU 317 is formed comprising a plurality of ECUs 321, . . . , 325 that are connected together via a network 151.

The cooperative control ECU 321 that acts as a server apparatus controls the cooperative action of a plurality of subsystems that act as a client apparatus, such as the motor control ECU 322, the reactive gas supply control ECU 323, the electrical power distribution control ECU 324, and the cell voltage detection control ECU 325.

Here, each of the ECUs 322, . . . , 325 that form each subsystem carry out control for I/O processing for control signals sent and received between the cooperative control ECU 321 and the controlled objects and the shut down and protective operations during the occurrence of an abnormality such as a network stoppage, and based on the control signal obtained by the I/O processing of each of the ECUs 322, . . . , 325, carries out the control operations for controlling each of the ECUs 322, . . . , 325.

As shown in FIG. 3, for example, the cooperative control ECU 321 is formed comprising an MPU 361, a communication controller 362, and a program writing control unit 363.

The MPU 361 receives each of the control signals after I/O processing from each of the ECUs 322, . . . , 325 that act as a plurality of subsystems via the communication controller 362, and carries out the control operations for cooperatively operating each of the ECUs 322, . . . , 325 based on these control signals. Furthermore, the MPU 361 determines whether or not the communication with the network 151 is operating normally, and at the same time, detects communication traffic, and based on the results of these determinations and the results of the detection, carries out switching control of the communication paths as will be described below.

In addition, the program writing control unit 363 controls the writing operation when the content or the like of the cooperative operation of each of the ECUs 322, . . . , 325 is modified or the appropriate program writing apparatus 365 modifies the operation control of the MPU 361 externally.

Figure 14:
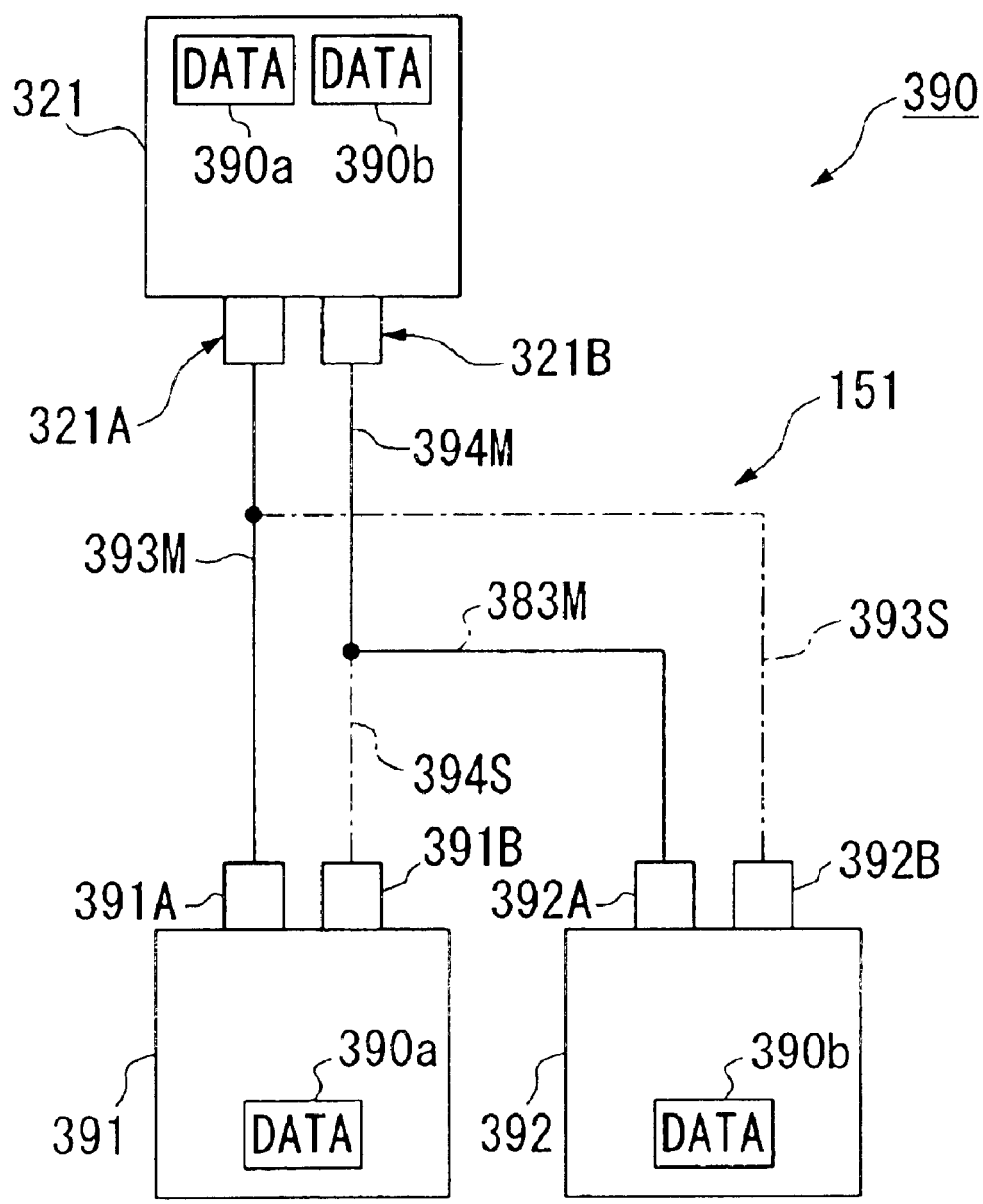
FIG. 14 is a structural diagram of a vehicle control system according to a modified example of the present embodiment.

As shown in FIG. 14, for example, each of the ECUs 322, . . . , 325 that act as a plurality of subsystems is formed comprising an MPU 371, a communication controller 372, a program writing control unit 373, an input circuit 374, and an output circuit 375.

The MPU 371 carries out control I/O processing comprising predetermined conversion processing and the like for signals received from the external sensor switch 376 and the like via the input circuit 374 and control signals received from the cooperative control ECU 321 via the communication controller 372. In addition, the signal from the input circuit 374 is sent to the cooperative control ECU 321 via the communication controller 372 and the control signal from the cooperative control ECU 321 is output to the actuator 377 via the output circuit 375.

Furthermore, the MPU 371 can independently control the shut down operation for the controlled objects such as the reactive gas supply unit 113, the protective operation for the fuel cell 112, or the like, and for example, outputs a control signal during the occurrence of an abnormality such as the stoppage of the network and the like to the actuator 377.

Moreover, the program writing control unit 373 controls the writing operation when, for example, the processing content of the I/O processing and the like in the MPU 371 are modified.

Figure 13:
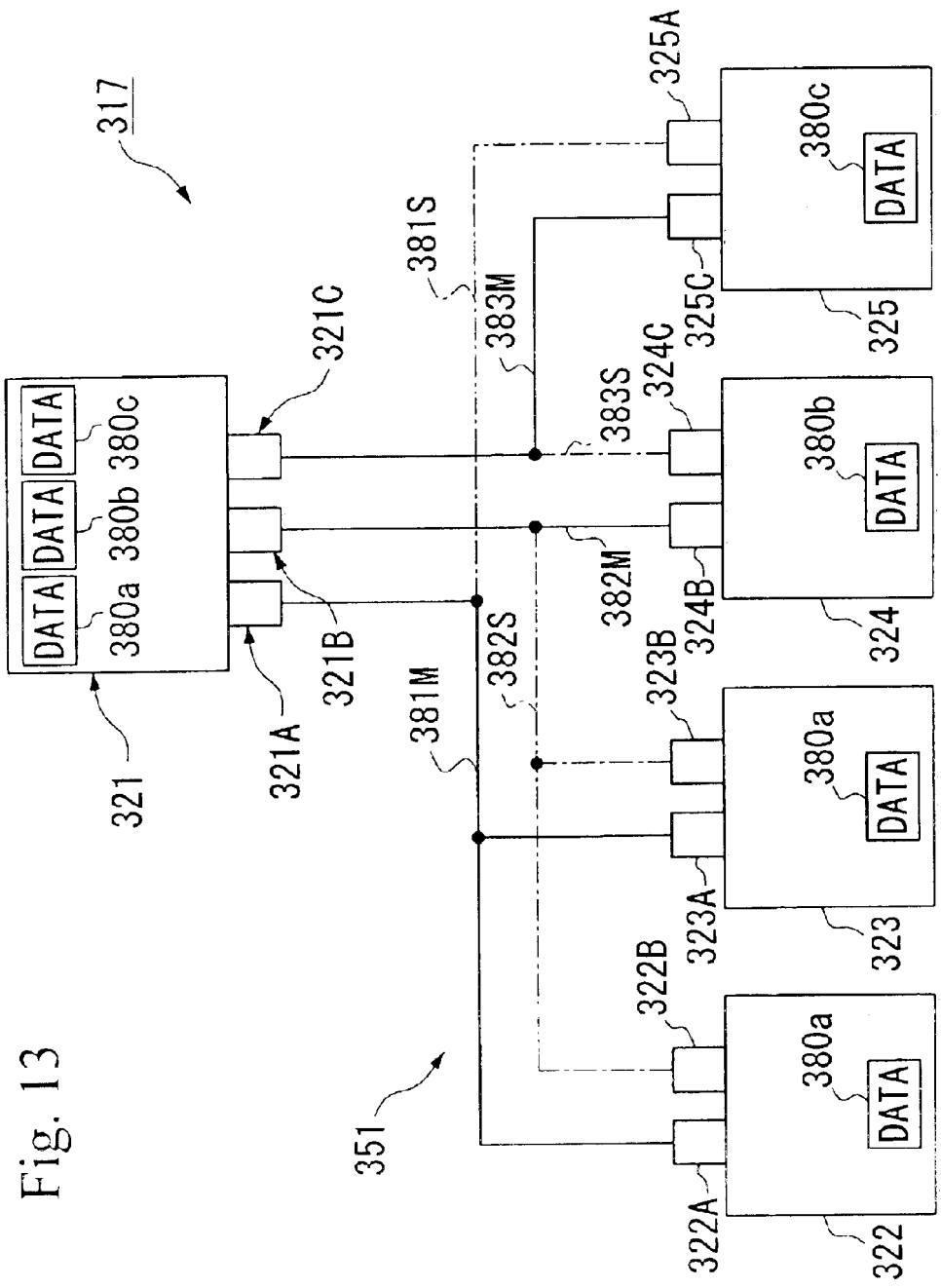
FIG. 13 is a structural diagram showing the communication paths of the network that connects the cooperative control ECU and each of the ECUs.

Furthermore, as shown in FIG. 13, the communication controller 362 of the cooperative control ECU 321 provides a plurality (for example, 3) of cooperative control side communication ports 321A, 321B, and 321C that are redundant.

In addition, the communication controller 372 of the motor control ECU 322 provides a plurality (for example, 2) of communication ports 322A and 322B that are redundant.

In addition, the communication controller 372 of the reactive gas supply control ECU 323 provides a plurality (for example, 2) of communication ports 323A and 323B that are redundant.

In addition, the communication controller 372 of the electrical power distribution control ECU 324 provides a plurality (for example, 2) of communication ports 324B and 324C that are redundant.

In addition, the communication controller 372 of the cell voltage detection control ECU 325 provides a plurality (for example, 2) of communication ports 325A and 325C that are redundant.

Additionally, for example, one communication port 322A of the motor control ECU 322A and one control port 323S of the reactive gas supply control ECU 323 are connected via the communication path 381M to the first cooperative control side communication port 321A, which is connected to the cooperative control ECU 321, and furthermore, the other communication port 325A of the cell voltage detection control ECU 325 is connected via the communication oath 381S.

Furthermore, one communication port 324B of the electrical power distribution control ECU 324 is connected via the communication path 382M to the second cooperative control side communication port 321B of the cooperative control ECU 321. Furthermore, the other communication port 322B of the motor control ECU 322 and the other communication port 323B of the reactive gas supply control ECU 323 are connected via the communication path 382S.

Furthermore, one communication port 325C of the cell voltage detection control ECU 325 is connected to the third cooperative control side communication port 321C of the cooperative control ECU 321 via the communication path 383M, and the other communication port 324C of the electrical power distribution control ECU 324 is connected via the communication path 383S.

Below, the functions of the cooperative control ECU 321 and each of the ECUs 322, . . . , 325 that form the plurality of subsystems will be explained.

The motor control ECU 322 refers to a predetermined control map based on motor control amounts such as the necessary torque value and the like received from the cooperative control ECU 321, and outputs the alternating current voltage command values of, for example, the U phase, the V phase, and the W phase. In addition, the U phase current, V phase current, and the W phase current are supplied to each phase of the motor for travel depending on each of these voltage command values.

The reactive gas supply control ECU 323 refers to a predetermined control map based on the reactive gas control amounts, for example, the flow rate and pressure of the reactive gases, that is, the hydrogen gas and the air, supplied to the fuel cell 112, received from the cooperative control ECU 321, and controls the valve aperture of the adjustable exhaust valve by, for example, the rotation speed of the air compressor that supplies the air or a stepping motor.

The electric power distribution ECU 324, for example, carries out a predetermined I/O processing on the signal for the output current and output voltage output from the fuel cell 112, the signal for the output current output from the power storage apparatus 114 and the voltage and temperature between terminals, and the like, and sends these to the cooperative control ECU 321, and at the same time carries out switching control of the power supply based on electric power distribution control signals received from the cooperative control ECU 321, for example, the control signals that indicate the operations of, for example, the high voltage distributor.

The cell voltage detection control ECU 325 monitors the voltage value of a plurality of cells that form the fuel cell 112, and calculates the average value, standard deviation, maximum, and minimum values for the voltage values detected for a plurality of cells, and outputs them to the cooperative control ECU 321.

The vehicle control system 110 according to the present embodiment provides the structure described above, and next, the operation of this vehicle control system 110 will be explained.

Moreover, Table 1 shows an example of communication paths selected respectively during normal operation and abnormal operation of the network 151 and the data sent and received.

TABLE 1

| communication system | traffic normal operation | abnormal operation (communication system 381 is abnormal) |
|---|---|---|
| 381 | 30% (data 380a) | — |
| 382 | 30% (data 380b) | 45% (data 380a + data 380b × 1/2) |
| 383 | 30% (data 380c) | 45% (data 380b × 1/2 + data 380c) |

Specifically, as shown in FIG. 13 and Table 1, during normal operation of he network 151, for example, the first cooperative control side communication port 321A of the cooperative control ECU 321 sends and receives the first data 380a between one of the communication ports 322A of the motor control ECU 322 and one of the communication ports 323A of the reactive gas supply control ECU 323 via the communication path 381M.

Furthermore, the second cooperative control side communication port 321B of the cooperative control ECU 321 sends and receives the second data 380b to and from one communication port 324B of the electrical power distribution control ECU 324 via the communication path 382M, and the third cooperative control side communication port 321C of the cooperative control ECU 321 sends and receives the third data 380C to and from one communication port 325C of the cell voltage detection control ECU 325 via the communication path 383M.

In this case, the communication traffic of each of the communication paths 381M (381S), 382M (382S), and 383M (383S) is, for example, 30% for each.

Here, in the case that damage occurs, for example, in the communication path 381 M, first, the data 380a being sent and received via the communication path 381M is set so as to be sent and received via the communication path 382S.

In addition, a predetermined amount (for example, one-half) of the data 380b that is sent and received via the communication path 382M is sent and received via communication path 383S.

Specifically, the second cooperative control side communication port 321B of the cooperative control ECU 321 sends and receives the first data 380a between the communication port 322B of the motor control ECU 322 and the other communication port 323B of the reactive gas supply control ECU 323 via the communication path 382S, and at the same time, sends and receives the partitioned second data 380b to and from the other communication port 324B of the electrical power distribution control ECU 324 via the communication path 382M.

Furthermore, the third cooperative control side communication port 321C of the cooperative control ECU 321 sends and receives the third data 380c to and from the other communication port of the cell voltage detection control ECU 325 via the communication path 383M, and at the same time, sends and receives the other partitioned second data 380b to and from the other communication port 324C of the electrical power distribution control ECU 324 via the communication path 383S.

Thereby, the communication traffic of each of the communication paths 382M (382S) and 383M (383M) is, for example, 45% for each.

As described above, according to the vehicle control system 110 of the present embodiment, by connecting the two communication ports 322A and 322B, communication ports 323A and 323B, communication ports 324B and 324C, and communication ports 325A and 325B respectively connected to the plurality of ECUs 322, . . . , 325 to any of the two cooperative control side communication ports among the three cooperative control side communication ports 321A, 321B, and 321C connected to the communication control ECU 321, even in the case that damage occurs on any of the cooperative control side communication ports 321A, 321B or 321C, the sending and receiving of data between each of the ECUs 322, . . . , 325 can be carried out by the other normally operating cooperative control side communication ports 321A, 321B, and 321C. Thereby, providing a plurality of communication ports and buses that are not used during the normal operation of the network 151 and are used only during the occurrence of an abnormality is not necessary, and compared to the case of, for example, providing a plurality of communication ports and communication paths corresponding one-to-one with each of the communication ports 322A, . . . , 325C of the plurality of ECUs 322, . . . , 325 in the communication control ECU 321, the number of required bus placements can be decreased, and when constructing the vehicle control system 110, the necessary costs can be reduced.

Furthermore, when switching the communication path of the data from a communication system in which an abnormality has occurred to a normally operating communication system, the amount of partitioning of the data can be adjusted even between the normally operating communication systems, and can be set so that the communication traffic in each of the communicating systems will flow smoothly. Thereby, for example, delays in the transmission of data and the like due to the communication traffic of a particular communication system increasing excessively can be prevented.

Moreover, in the present embodiment, when the communication path of the first data 380a is switched from a communication system 381 on which an abnormality has occurred to a normally operating communication system 381 or 383, in the normally operating communication systems 382 and 383, the communication traffic is set so as to flow smoothly, but it is not limited thereby, and for example, can be set so as to cause an unbalance in the communication traffic in each of the communication systems 382 and 383, or, for example, can be set so that the communication traffic in any of the communication systems will increase. In sum, when switching the communication path of the data from a communication system on which an abnormality has occurred to a normally operating communication system, it can be set so that transmission delays and the like due to the communication traffic excessively increasing do not exceed a predetermined permitted range. Moreover, the adjustment of the communication traffic in each of the communication systems 381, 382, and 383 can reflect the predetermined distribution rate set in advance, and for example, distributed such that the current communication traffic is detected and allocated so as not to exceed a predetermined threshold.

In addition, in the present embodiment, the three cooperative control side communication ports 321A, 321B and 321C are connected to the cooperative control ECU 321, but it is not limited thereby, and can be connected to four or more cooperative control side communication ports. For example, like the vehicle control system 390 according to the modified example of the present embodiment shown in FIG. 14, the two cooperative control side communication ports 321A and 321B can be connected.

In the vehicle control system 390 according to the modified example of the present embodiment shown in FIG. 14, the two redundant cooperative control side communication ports 321A and 321B are connected to the cooperative control ECU 321.

In addition, a plurality (for example, two each) of redundant communication ports 391A and 391B and communication ports 392A and 392B are respectively connected to each of the communication controllers 372 of the plurality (for example, two) of the first and second ECUs 391 and 392 that act as subsystems.

In addition, in the communication system 393 for example, one communication port 391A of the first ECU 391 is connected via the communication path 393M to the first cooperative control side communication port 321A of the cooperative control ECU 321, while one communications port 392A of the second ECU 392 is connected via the communication path 393S.

Furthermore, in the communication system 394, the other communication port 392B of the second ECU 392 is connected via the communication path 394M to the second cooperative control side communication port 321B of the cooperative control ECU 321, while the other communication port of the first ECU 391B is connected via the communication path 394S.

Moreover, in Table 2, a summary of the communication paths selected respectively during the normal operation and when damage has occurred on network 151 and the data that is sent and received is shown.

TABLE 2

| Communication System | Normal Operation | Abnormal Operation of Communication System 393 | Abnormal Operation of Communication System 394 |
| --- | --- | --- | --- |
| 393 | data 390a communication path 393M | — | communication path 393M (data 390b) |
| 394 | data 90b communication path 94M | communication path 394M (data 390b) communication path 394S (data 390a) | — |

Specifically, as shown in FIG. 14 and Table 2, during normal operation of network 151, example, the first cooperative control side communication port 321A of the control ECU 321 sends and receives first data 390a to and from the one communication port 391A of the first ECU 391 via the communication path 393M.

Furthermore, the second cooperative control side communication port 321B of the cooperative control ECU 321 sends and receives the second data 390b to and from the other communication port 392B of the second ECU 391 via the communication path 394M.

Here, in the case that damage has occurred on the communication path 393M, for example, the second cooperative control side communicating port 321B of the cooperative control ECU 321 sends and receives the first data 390a to and from the other communication port 391B of the first ECU 391 via the communication path 394S, and at the same time sends and receives the second data 390b to and from the other communication port 392B of the second ECU 392 via the communication path 394.

In contrast, in the case that damage has occurred on the communication path 394, for example, the first cooperative control side communication port 321A of the cooperative control ECU 321 sends and receives the first data 390a to and from the one communication port 391A of the first ECU 391 via the communication path 393M, and at the same time, sends and receives the second data 390b to and from the one communication port 392A of the second ECU 392 via the communication path 393S.

Specifically, during normal operation, different data 390*a* and 390*b* is sent and received respectively by the two separate communication systems 393 and 394, and in the case that damage occurs to either of the communication systems 393 or 394, the data 390*a* and 390*b* are sent and received by either of the communication paths 393 or 394 on which no damage has occurred.

Moreover, in the present embodiment, the vehicle control systems 110 and 390 are mounted in a fuel cell vehicle, but it is not limited thereby, and may be mounted on another vehicle, for example, a hybrid vehicle or the like.

What is claimed is:

1. A vehicle control system comprising a plurality of control devices which form a plurality of subsystems connected to respective controlled objects and a cooperative control device which cooperatively operates said plurality of control devices through a communication line, wherein the vehicle control system further comprises:
   a priority assigning device which assigns a priority to data sent and received via said communication line;
   a plurality of FIFO storage devices which temporarily store said data after being classified depending on said priority; and
   a data sending device which sends said data according to its priority from said FIFO storage device which stores said data having a high priority.

2. A vehicle control system according to claim 1, wherein, said data sending device which sends data according to its priority stops transmission of said data being sent when the data with a priority that is higher than said data being sent is stored in said FIFO storage device and sends said data having the higher priority.

3. A vehicle control system according to claim 1, further comprising.
   a packet generating device that generates packets as said data and a message generating device that partitions said packets into messages depending on a communication protocol; wherein
   said priority assigning device assigns said priority depending on the length of said packet;
   said plurality of FIFO storage devices classify and temporarily store said message depending on said priority of said packets; and
   said data transmission device sends said message according to the priority from said FIFO storage device that stores said packets assigned said high priority.

4. A vehicle control system comprising:
   a plurality of control devices which forms a plurality of subsystems connected to respective controlled objects, and
   a cooperative control device which cooperatively operates said plurality of control devices through a communication line,
   wherein said cooperative control device comprises;
      a plurality of different cooperative control side communication ports,
      a data sending and receiving device that carries out transmission and receiving of data to and from said plurality of control devices through said cooperative control side communication ports,
      a determination device that determines whether or not an abnormality has occurred in the transmission and receiving of said data, wherein
   said plurality of control devices each comprise a plurality of communication ports that connect at least two or more of said plurality of cooperative control side communication ports, and wherein
   said data sending and receiving device of said cooperative control device, depending on the results of the determination by the determination device, sends and receives said data to and from each of said plurality of communication ports of said control devices, and in addition, said data sent to and received from said communication ports where said abnormality has occurred is sent to and received from any communication ports where said abnormality has not occurred.

5. A vehicle control system comprising:
   a plurality of control devices which forms a plurality of subsystems connected to respective controlled objects and a cooperative control device which cooperatively operates said plurality of control devices through a communication line, wherein the vehicle control system further comprises:
   a plurality of different cooperative control side communication ports,
   a data sending and receiving device that sends and receives data to and from said plurality of control device through said cooperative control side communication port;
   a determination device that determines whether or not an abnormality has occurred in the sending or receiving of said data;
   a data partitioning devices that generates a plurality of segments of partitioned data by partitioning said data according to the results of the determination by said determination device;
   said plurality of control devices each comprises a plurality of communication ports that connect at least two or more of said plurality of cooperative control side communication ports, wherein:
   said data sending and receiving device of said cooperative control device sends and receives different data to and from each of said plurality of communication ports of said control device depending on the result of a determination of said determination apparatus, and in addition, said plurality of partitioned data is sent and received by being distributed over said plurality of communication ports on which no abnormality has occurred.

6. A vehicle control system comprising
   a plurality of control devices which forms a plurality of subsystems connected to respective controlled objects and a cooperative control device which cooperatively operates said plurality of control devices through a communication line, wherein
   each of said plurality of control devices comprises an input/output control device for conducting input and output processing for the signals sent and received between said cooperative control devices and said controlled objects; and
   said cooperative control device comprises a control calculation device for calculating control signals which control operations of said plurality of control devices and said controlled objects based on the received signals that have been received from said plurality of control devices, wherein said plurality of control devices provides an autonomous control device which controls the operations of said controlled objects independently from said cooperative control device during the occurrence of an abnormality between said communication systems and said cooperative control devices or said cooperative control device.

7. A vehicle control system according to claim 6, wherein said control calculation device of said cooperative control device calculates controlled physical values to be attained by operations of said plurality of control devices and said controlled objects as control signals which control the operation of said plurality of control devices and said controlled objects; and said input/output control devices of said control system convert said controlled physical values which have been received from said cooperative control device to operation command values that indicate directly the operation of said control devices and said controlled objects.

* * * * *